US011875162B2

(12) United States Patent
Garstenauer et al.

(10) Patent No.: US 11,875,162 B2
(45) Date of Patent: *Jan. 16, 2024

(54) COMPUTER-GENERATED REALITY PLATFORM FOR GENERATING COMPUTER-GENERATED REALITY ENVIRONMENTS

(71) Applicant: Apple Inc., Cupertino, CA (US)

(72) Inventors: Helmut Garstenauer, Santa Clara, CA (US); Martin Garstenauer, Santa Clara, CA (US); Edwin Iskandar, San Jose, CA (US); Timothy R. Oriol, San Jose, CA (US); Geoffrey Stahl, San Jose, CA (US); Cody J. White, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/845,708

(22) Filed: Jun. 21, 2022

(65) Prior Publication Data

US 2022/0318035 A1    Oct. 6, 2022

Related U.S. Application Data

(63) Continuation of application No. 16/800,562, filed on Feb. 25, 2020, now Pat. No. 11,372,655, which is a
(Continued)

(51) Int. Cl.
*G06F 9/451* (2018.01)
*G06F 3/01* (2006.01)
*G06T 19/00* (2011.01)

(52) U.S. Cl.
CPC .............. *G06F 9/451* (2018.02); *G06F 3/011* (2013.01); *G06T 19/006* (2013.01)

(58) Field of Classification Search
None
See application file for complete search history.

(56) References Cited

U.S. PATENT DOCUMENTS 11,157,739 B1 * 10/2021 Iskandar ............... H04W 4/021
2007/0078636 A1    4/2007 Elsberg et al.
(Continued)

FOREIGN PATENT DOCUMENTS

CN    105453011 A    3/2016
CN    105637563 A    6/2016
(Continued)

OTHER PUBLICATIONS

Applicant Initiated Interview Summary received for U.S. Appl. No. 16/800,562, dated Aug. 27, 2021, 5 pages.
(Continued)

*Primary Examiner* — Patrick F Valdez
(74) *Attorney, Agent, or Firm* — DLA Piper LLP (US)

(57) ABSTRACT

The present disclosure relates to providing a computer-generated reality (CGR) platform for generating CGR environments including virtual and augmented reality environments. In some embodiments, information related to an object to be simulated and rendered in the CGR environment is provided to the CGR platform, and a three-dimensional representation of the object is displayed in the CGR environment.

18 Claims, 27 Drawing Sheets

Related U.S. Application Data continuation of application No. PCT/US2018/052732, filed on Sep. 25, 2018.

(60) Provisional application No. 62/622,725, filed on Jan. 26, 2018, provisional application No. 62/565,831, filed on Sep. 29, 2017.

(56) References Cited

U.S. PATENT DOCUMENTS

| | | |
|---|---|---|
| 2009/0132931 A1 | 5/2009 | Tatsubori |
| 2011/0242134 A1 | 10/2011 | Miller et al. |
| 2012/0038667 A1 | 2/2012 | Branson et al. |
| 2012/0113140 A1 | 5/2012 | Hilliges et al. |
| 2013/0117377 A1 | 5/2013 | Miller |
| 2013/0121528 A1 | 5/2013 | Ikenoue et al. |
| 2013/0141530 A1* | 6/2013 | Zavesky ............... G06T 19/20 348/43 |
| 2014/0120887 A1 | 5/2014 | Huang |
| 2014/0248950 A1 | 9/2014 | Tosas Bautista |
| 2014/0285519 A1 | 9/2014 | Uusitalo et al. |
| 2014/0313197 A1* | 10/2014 | Peuhkurinen ........... G06T 17/05 345/426 |
| 2014/0327690 A1 | 11/2014 | Mcguire et al. |
| 2014/0368532 A1 | 12/2014 | Keane et al. |
| 2015/0116310 A1 | 4/2015 | Baudouin et al. |
| 2015/0222730 A1* | 8/2015 | Gower .................... H04L 67/01 709/203 |
| 2015/0302621 A1 | 10/2015 | Liu et al. |
| 2016/0093108 A1 | 3/2016 | Mao et al. |
| 2016/0180598 A1* | 6/2016 | Rogers ................ G06Q 20/145 345/633 |
| 2016/0196694 A1 | 7/2016 | Lindeman |
| 2016/0217616 A1 | 7/2016 | Kraver |
| 2016/0363774 A1 | 12/2016 | Kawasima |
| 2016/0371884 A1 | 12/2016 | Benko et al. |
| 2020/0233681 A1 | 7/2020 | Garstenauer et al. |
| 2021/0006478 A1 | 1/2021 | Levitt |

FOREIGN PATENT DOCUMENTS

| | | |
|---|---|---|
| CN | 106716306 A | 5/2017 |
| EP | 2793127 A1 | 10/2014 |
| WO | 2015/192117 A1 | 12/2015 |
| WO | 2016/130860 A2 | 8/2016 |
| WO | 2016/164178 A1 | 10/2016 |
| WO | 2017/027183 A1 | 2/2017 |

OTHER PUBLICATIONS

Applicant Initiated Interview Summary received for U.S. Appl. No. 16/800,562, dated Jan. 3, 2022, 4 pages.

Applicant-Initiated Interview Summary received for U.S. Appl. No. 16/554,402, dated Feb. 17, 2021, 3 pages.

Final Office Action received for U.S. Appl. No. 16/800,562, dated Nov. 1, 2021, 18 pages.

International Preliminary Report on Patentability received for PCT Patent Application No. PCT/US2018/052732, dated Apr. 9, 2020, 20 pages.

International Search Report and Written Opinion received for PCT Patent Application No. PCT/US2018/052732, dated Mar. 22, 2019, 26 pages.

Invitation to Pay Additional Fees and Partial International Search Report received for PCT Patent Application No. PCT/US2018/052732, dated Jan. 31, 2019, 16 pages.

Non-Final Office Action received for U.S. Appl. No. 16/554,402, dated Nov. 12, 2020, 28 pages.

Non-Final Office Action received for U.S. Appl. No. 16/800,562, dated Apr. 15, 2021, 17 pages.

Notice of Allowance received for U.S. Appl. No. 16/554,402, dated Jun. 25, 2021, 12 pages.

Notice of Allowance received for U.S. Appl. No. 16/554,402, dated Mar. 10, 2021, 12 pages.

Notice of Allowance received for U.S. Appl. No. 16/800,562, dated Feb. 24, 2022, 12 pages.

Office Action received for Chinese Patent Application No. 201880055357.6, dated Sep. 1, 2021, 36 pages.

Office Action received for European Patent Application No. 18793512.7, dated Feb. 2, 2022, 10 pages.

Notice of Allowance received for Chinese Patent Application No. 201880055357.6, dated May 6, 2022, 5 pages (1 page of English Translation and 4 pages of Official Copy).

* cited by examiner

1124
Wherein the three-dimensional computer-generated reality environment includes a three-dimensional representation of a virtual entity, and wherein simulating the three-dimensional representation of the received data object in the three-dimensional computer-generated reality environment comprises: updating the three-dimensional representation of the virtual entity based on the received data object, wherein the three-dimensional representation of the received data object and the updated three-dimensional representation of the virtual entity are concurrently simulated in the space of the three-dimensional computer-generated reality environment.

1126
Wherein the application is a first application, wherein the virtual entity is represented by a third data object corresponding to a third application, the method further comprising: receiving, by the process of the operating system, the third data object from a process of the third application.

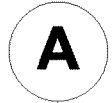

1128
Render, by the process of the operating system, the computer-generated reality environment including the representation of the first data object and the representation of the second data object.

1130
Cause a display of the rendered computer-generated reality environment.

FIG. 11C

COMPUTER-GENERATED REALITY PLATFORM FOR GENERATING COMPUTER-GENERATED REALITY ENVIRONMENTS

CROSS-REFERENCE TO RELATED APPLICATIONS

This application is a continuation U.S. Non-provisional patent application Ser. No. 16/800,562, entitled "COMPUTER-GENERATED REALITY PLATFORM FOR GENERATING COMPUTER-GENERATED REALITY ENVIRONMENTS," filed Sep. 25, 2018, which is a continuation of PCT Application No. PCT/US2018/52732, entitled "COMPUTER-GENERATED REALITY PLATFORM," filed Sep. 25, 2018, which claims priority to U.S. Provisional Patent Application No. 62/622,725, entitled "MIXED-REALITY PLATFORM," filed Jan. 26, 2018, and to U.S. Provisional Patent Application No. 62/565,831, entitled "MIXED-REALITY PLATFORM," filed Sep. 29, 2017, which are hereby incorporated by reference in their entirety.

FIELD

The present disclosure relates generally to computer-generated reality systems, and more specifically to techniques for providing a computer-generated reality environment.

BACKGROUND

As the capability of electronic devices increases and their ability to output high-quality visual displays improves, applications are becoming more immersive. One such example is the increasing mainstream demand for computer-generated reality (e.g., "mixed reality" and "virtual reality") applications.

BRIEF SUMMARY

The techniques described herein provide a computer-generated reality platform for generating computer-generated reality environments. Such techniques optionally complement or replace other methods for generating computer-generated reality environments. Such techniques can improve the user experience, increase privacy and security, and enable computer-generated reality interfaces (e.g., 3D interfaces) with advanced functionality.

In some embodiments, a computer-implemented method performed at an electronic device includes: receiving a first input indicative of a request to launch a first application in the three-dimensional computer-generated reality environment; in response to receiving the first input, initiating a process of the first application; receiving a second input indicative of a request to launch a second different from the first application in the three-dimensional computer-generated reality environment; in response to receiving the second input, initiating a process of the second application different from the process of the first application; providing to a process of an operating system of the electronic device, by the process of the first application, a first data object, wherein the process of the operating system is different from the process of the first application and from the process of the second application; providing to the process of the operating system, by the process of the second application, a second data object different from the first data object; rendering, by the process of the operating system of the electronic device, a three-dimensional representation of the first data object and a three-dimensional representation of the second data object in the three-dimensional computer-generated reality environment; and causing a display of the rendered three-dimensional computer-generated reality environment.

In some embodiments, a non-transitory computer-readable storage medium stores one or more programs configured to be executed by one or more processors of an electronic device, the one or more programs include instructions for: receiving a first input indicative of a request to launch a first application in the three-dimensional computer-generated reality environment; in response to receiving the first input, initiating a process of the first application; receiving a second input indicative of a request to launch a second different from the first application in the three-dimensional computer-generated reality environment; in response to receiving the second input, initiating a process of the second application different from the process of the first application; providing to a process of an operating system of the electronic device, by the process of the first application, a first data object, wherein the process of the operating system is different from the process of the first application and from the process of the second application; providing to the process of the operating system, by the process of the second application, a second data object different from the first data object; rendering, by the process of the operating system of the electronic device, a three-dimensional representation of the first data object and a three-dimensional representation of the second data object in the three-dimensional computer-generated reality environment; and causing a display of the rendered three-dimensional computer-generated reality environment.

In some embodiments, a transitory computer-readable storage medium stores one or more programs configured to be executed by one or more processors of an electronic device, the one or more programs include instructions for: receiving a first input indicative of a request to launch a first application in the three-dimensional computer-generated reality environment; in response to receiving the first input, initiating a process of the first application; receiving a second input indicative of a request to launch a second different from the first application in the three-dimensional computer-generated reality environment; in response to receiving the second input, initiating a process of the second application different from the process of the first application; providing to a process of an operating system of the electronic device, by the process of the first application, a first data object, wherein the process of the operating system is different from the process of the first application and from the process of the second application; providing to the process of the operating system, by the process of the second application, a second data object different from the first data object; rendering, by the process of the operating system of the electronic device, a three-dimensional representation of the first data object and a three-dimensional representation of the second data object in the three-dimensional computer-generated reality environment; and causing a display of the rendered three-dimensional computer-generated reality environment.

In some embodiments, an electronic device, includes one or more processors, and memory storing one or more programs configured to be executed by the one or more processors, the one or more programs including instructions for: receiving a first input indicative of a request to launch a first application in the three-dimensional computer-generated reality environment; in response to receiving the first input, initiating a process of the first application; receiving a second input indicative of a request to launch a second different from the first application in the three-dimensional computer-generated reality environment; in response to receiving the second input, initiating a process of the second application different from the process of the first application; providing to a process of an operating system of the electronic device, by the process of the first application, a first data object, wherein the process of the operating system is different from the process of the first application and from the process of the second application; providing to the process of the operating system, by the process of the second application, a second data object different from the first data object; rendering, by the process of the operating system of the electronic device, a three-dimensional representation of the first data object and a three-dimensional representation of the second data object in the three-dimensional computer-generated reality environment; and causing a display of the rendered three-dimensional computer-generated reality environment.

In some embodiments, an electronic device includes: means for receiving a first input indicative of a request to launch a first application in the three-dimensional computer-generated reality environment; means for in response to receiving the first input, initiating a process of the first application; means for receiving a second input indicative of a request to launch a second different from the first application in the three-dimensional computer-generated reality environment; means for in response to receiving the second input, initiating a process of the second application different from the process of the first application; means for providing to a process of an operating system of the electronic device, by the process of the first application, a first data object, wherein the process of the operating system is different from the process of the first application and from the process of the second application; means for providing to the process of the operating system, by the process of the second application, a second data object different from the first data object; means for rendering, by the process of the operating system of the electronic device, a three-dimensional representation of the first data object and a three-dimensional representation of the second data object in the three-dimensional computer-generated reality environment; and means for causing a display of the rendered three-dimensional computer-generated reality environment.

In some embodiments, a computer-implemented method performed at an electronic device includes: receiving a first input indicative of a request to launch an application in the computer-generated reality environment; upon receiving the first input, initiating a process of the application; and providing, by the process of the application, a first data object to a process of an operating system of the electronic device, wherein the data object corresponds to the application; receiving a second input indicative of a request for a representation of a physical entity in the computer-generated reality environment; upon receiving the second input: obtaining, by the process of the operating system, a second data object, wherein the second data object corresponds to the physical entity; simulating, by the process of the operating system, the computer-generated reality environment, wherein the simulated computer-generated reality environment comprises a representation of the first data object and a representation of the second data object.

In some embodiments, a non-transitory computer-readable storage medium stores one or more programs configured to be executed by one or more processors of an electronic device, the one or more programs include instructions for: receiving a first input indicative of a request to launch an application in the computer-generated reality environment; upon receiving the first input, initiating a process of the application; and providing, by the process of the application, a first data object to a process of an operating system of the electronic device, wherein the data object corresponds to the application; receiving a second input indicative of a request for a representation of a physical entity in the computer-generated reality environment; upon receiving the second input: obtaining, by the process of the operating system, a second data object, wherein the second data object corresponds to the physical entity; simulating, by the process of the operating system, the computer-generated reality environment, wherein the simulated computer-generated reality environment comprises a representation of the first data object and a representation of the second data object.

In some embodiments, a transitory computer-readable storage medium stores one or more programs configured to be executed by one or more processors of an electronic device, the one or more programs include instructions for: receiving a first input indicative of a request to launch an application in the computer-generated reality environment; upon receiving the first input, initiating a process of the application; and providing, by the process of the application, a first data object to a process of an operating system of the electronic device, wherein the data object corresponds to the application; receiving a second input indicative of a request for a representation of a physical entity in the computer-generated reality environment; upon receiving the second input: obtaining, by the process of the operating system, a second data object, wherein the second data object corresponds to the physical entity; simulating, by the process of the operating system, the computer-generated reality environment, wherein the simulated computer-generated reality environment comprises a representation of the first data object and a representation of the second data object.

In some embodiments, an electronic device, includes one or more processors, and memory storing one or more programs configured to be executed by the one or more processors, the one or more programs including instructions for: receiving a first input indicative of a request to launch an application in the computer-generated reality environment; upon receiving the first input, initiating a process of the application; and providing, by the process of the application, a first data object to a process of an operating system of the electronic device, wherein the data object corresponds to the application; receiving a second input indicative of a request for a representation of a physical entity in the computer-generated reality environment; upon receiving the second input: obtaining, by the process of the operating system, a second data object, wherein the second data object corresponds to the physical entity; simulating, by the process of the operating system, the computer-generated reality environment, wherein the simulated computer-generated reality environment comprises a representation of the first data object and a representation of the second data object.

In some embodiments, an electronic device includes: means for receiving a first input indicative of a request to launch an application in the computer-generated reality environment; upon receiving the first input, means for initiating a process of the application; and means for providing, by the process of the application, a first data object to a process of an operating system of the electronic device, wherein the data object corresponds to the application; means for receiving a second input indicative of a request for a representation of a physical entity in the computer-generated reality environment; upon receiving the second input: means for obtaining, by the process of the operating system, a second data object, wherein the second data object corresponds to the physical entity; means for simulating, by the process of the operating system, the computer-generated reality environment, wherein the simulated computer-generated reality environment comprises a representation of the first data object and a representation of the second data object.

In some embodiments, a computer-implemented method performed at an electronic device includes: simulating, by a process of an operating system of the electronic device, the three-dimensional computer-generated reality environment comprising a three-dimensional representation of a space; and while simulating the three-dimensional computer-generated reality environment: receiving an input indicative of a request to launch an application in the three-dimensional computer-generated reality environment; and in response to receiving the input: initiating a process of the application; receiving, by the process of the operating system, a data object from the process of the application; and simulating, by the process of the operating system, a three-dimensional representation of the received data object in the three-dimensional computer-generated reality environment.

In some embodiments, a non-transitory computer-readable storage medium stores one or more programs configured to be executed by one or more processors of an electronic device, the one or more programs include instructions for: simulating, by a process of an operating system of the electronic device, the three-dimensional computer-generated reality environment comprising a three-dimensional representation of a space; and while simulating the three-dimensional computer-generated reality environment: receiving an input indicative of a request to launch an application in the three-dimensional computer-generated reality environment; and in response to receiving the input: initiating a process of the application; receiving, by the process of the operating system, a data object from the process of the application; and simulating, by the process of the operating system, a three-dimensional representation of the received data object in the three-dimensional computer-generated reality environment.

In some embodiments, a transitory computer-readable storage medium stores one or more programs configured to be executed by one or more processors of an electronic device, the one or more programs include instructions for: simulating, by a process of an operating system of the electronic device, the three-dimensional computer-generated reality environment comprising a three-dimensional representation of a space; and while simulating the three-dimensional computer-generated reality environment: receiving an input indicative of a request to launch an application in the three-dimensional computer-generated reality environment; and in response to receiving the input: initiating a process of the application; receiving, by the process of the operating system, a data object from the process of the application; and simulating, by the process of the operating system, a three-dimensional representation of the received data object in the three-dimensional computer-generated reality environment.

In some embodiments, an electronic device, includes one or more processors, and memory storing one or more programs configured to be executed by the one or more processors, the one or more programs including instructions for: simulating, by a process of an operating system of the electronic device, the three-dimensional computer-generated reality environment comprising a three-dimensional representation of a space; and while simulating the three-dimensional computer-generated reality environment: receiving an input indicative of a request to launch an application in the three-dimensional computer-generated reality environment; and in response to receiving the input: initiating a process of the application; receiving, by the process of the operating system, a data object from the process of the application; and simulating, by the process of the operating system, a three-dimensional representation of the received data object in the three-dimensional computer-generated reality environment.

In some embodiments, an electronic device includes: means for simulating, by a process of an operating system of the electronic device, the three-dimensional computer-generated reality environment comprising a three-dimensional representation of a space; and while simulating the three-dimensional computer-generated reality environment: means for receiving an input indicative of a request to launch an application in the three-dimensional computer-generated reality environment; and in response to receiving the input: means for initiating a process of the application; means for receiving, by the process of the operating system, a data object from the process of the application; and means for simulating, by the process of the operating system, a three-dimensional representation of the received data object in the three-dimensional computer-generated reality environment.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

DESCRIPTION OF THE FIGURES

In the following description, reference is made to the accompanying drawings which form a part thereof, and which illustrate several embodiments of the present disclosure. It is understood that other embodiments may be utilized and structural and operational changes may be made without departing from the scope of the present disclosure. The use of the same reference symbols in different drawings indicates similar or identical items.

FIGS. 11A-11C depict a flow diagram illustrating a method of generating a computer-generated reality environment in accordance with some embodiments.

DETAILED DESCRIPTION

Figure 1A:
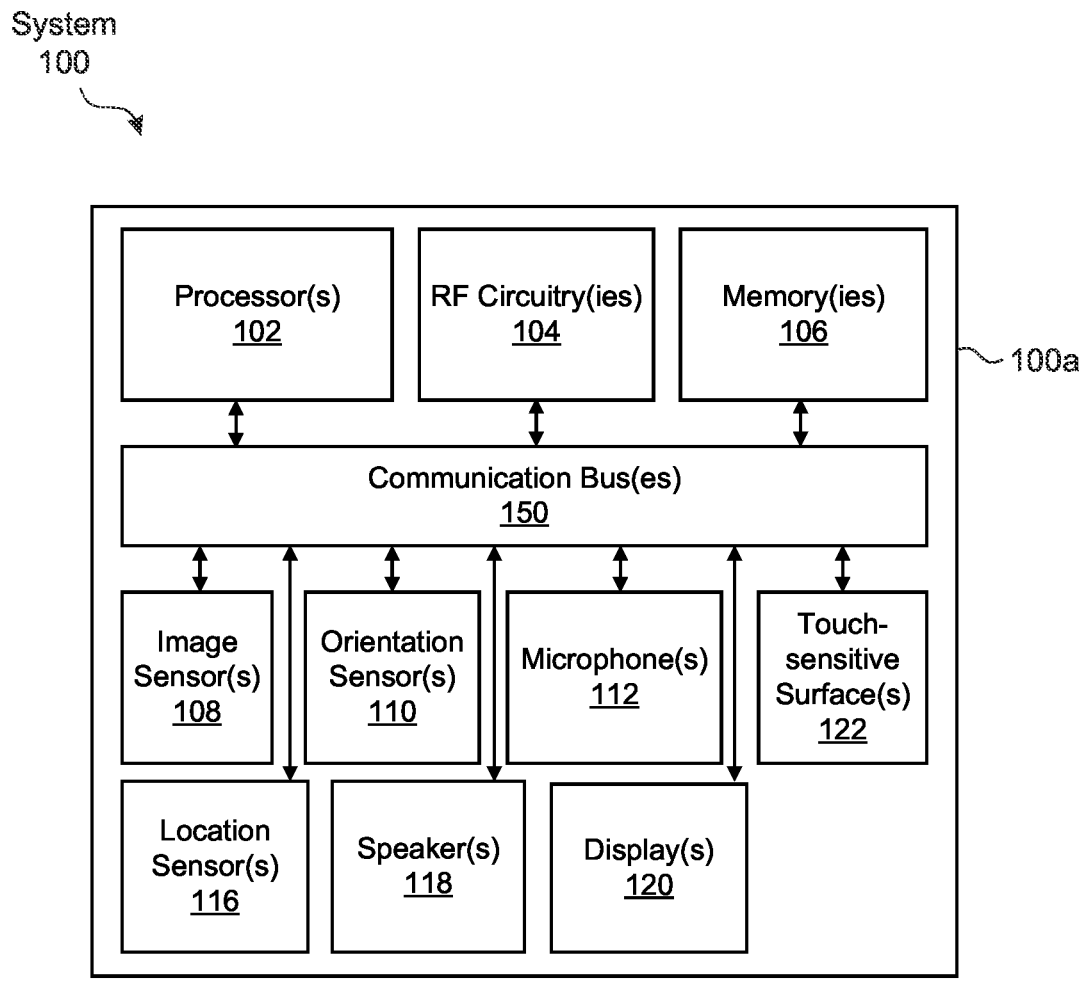
FIGS. 1A-1B depict exemplary systems for use in various computer-generated reality technologies, including virtual reality and mixed reality.

The following description is presented to enable a person of ordinary skill in the art to make and use the various embodiments. Descriptions of specific devices, techniques, and applications are provided only as embodiments. Various modifications to the embodiments described herein will be readily apparent to those of ordinary skill in the art, and the general principles defined herein may be applied to other embodiments and applications without departing from the spirit and scope of the various embodiments. Thus, the various embodiments are not intended to be limited to the embodiments described herein and shown, but are to be accorded the scope consistent with the claims.

Various embodiments of electronic systems and techniques for using such systems in relation to various computer-generated reality technologies, including virtual reality and mixed reality (which incorporates sensory inputs from a physical environment), are described.

A physical environment (or real environment) refers to a physical world that people can sense and/or interact with without aid of electronic systems. Physical environments, such as a physical park, include physical articles (also referred to as physical objects, physical entities, or real objects), such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment (or virtual environment) refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
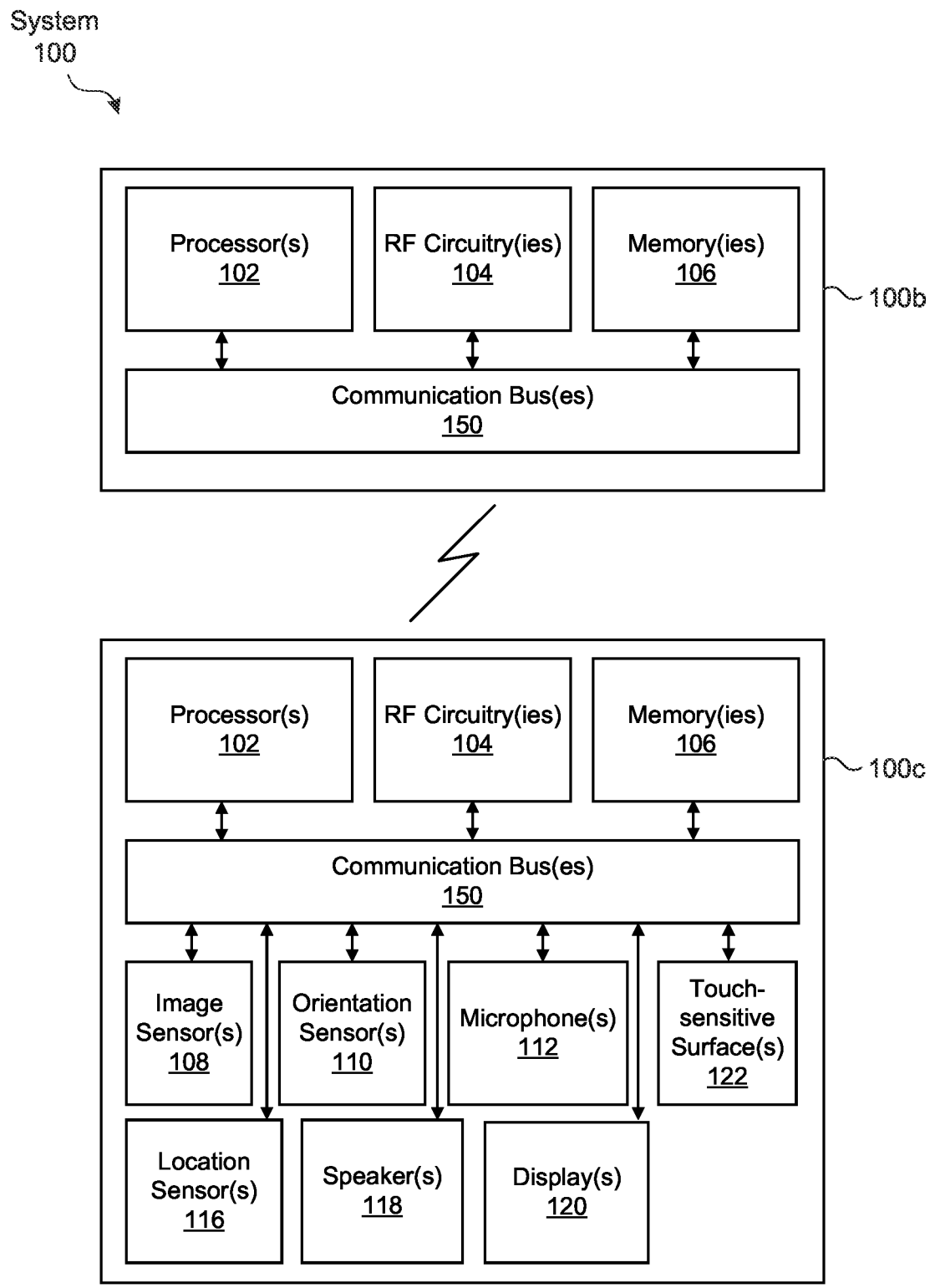

FIG. 1A and FIG. 1B depict exemplary system 100 for use in various computer-generated reality technologies, including virtual reality and mixed reality.

In some embodiments, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some embodiments, elements of system 100 are implemented in a base station device (e.g., a computing device, such as a remote server, mobile device, or laptop) and other elements of the system 100 are implemented in a head-mounted display (HIVID) device designed to be worn by the user, where the HMD device is in communication with the base station device. In some embodiments, device 100a is implemented in a base station device or a HMD device.

As illustrated in FIG. 1B, in some embodiments, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

Figure 1C:
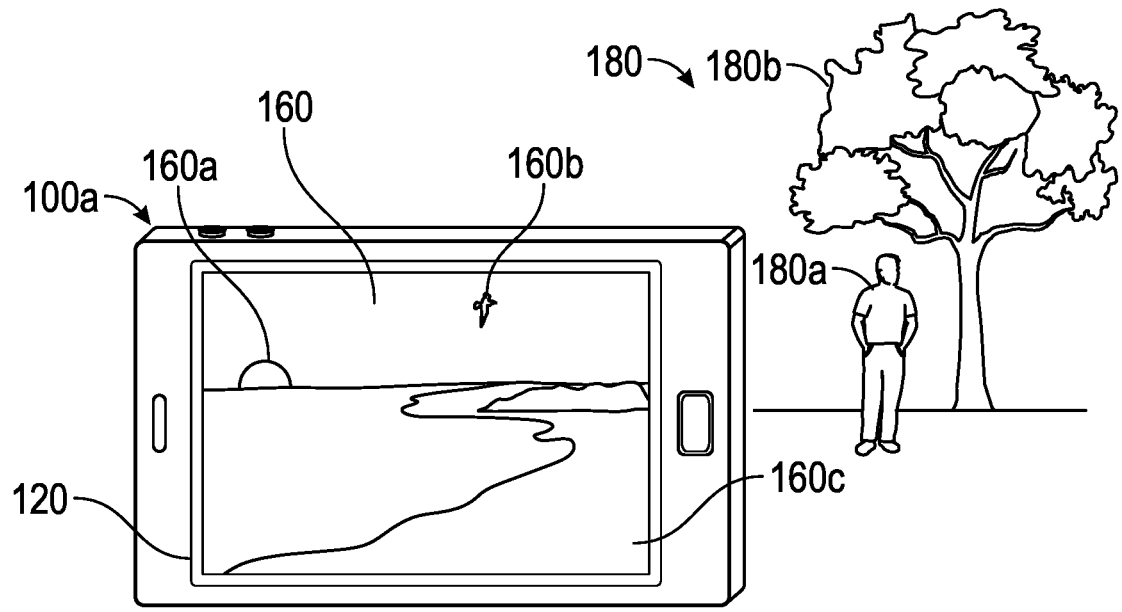
FIGS. 1C-1E illustrate embodiments of the system in the form of mobile devices.
Figure 1D:
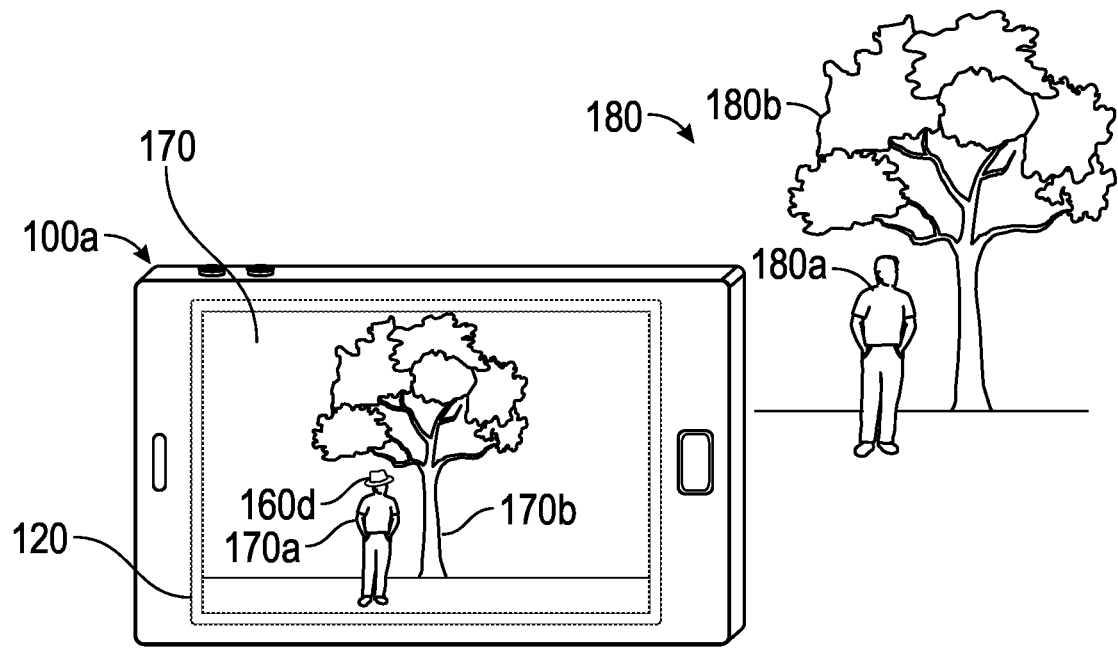
Figure 1E:
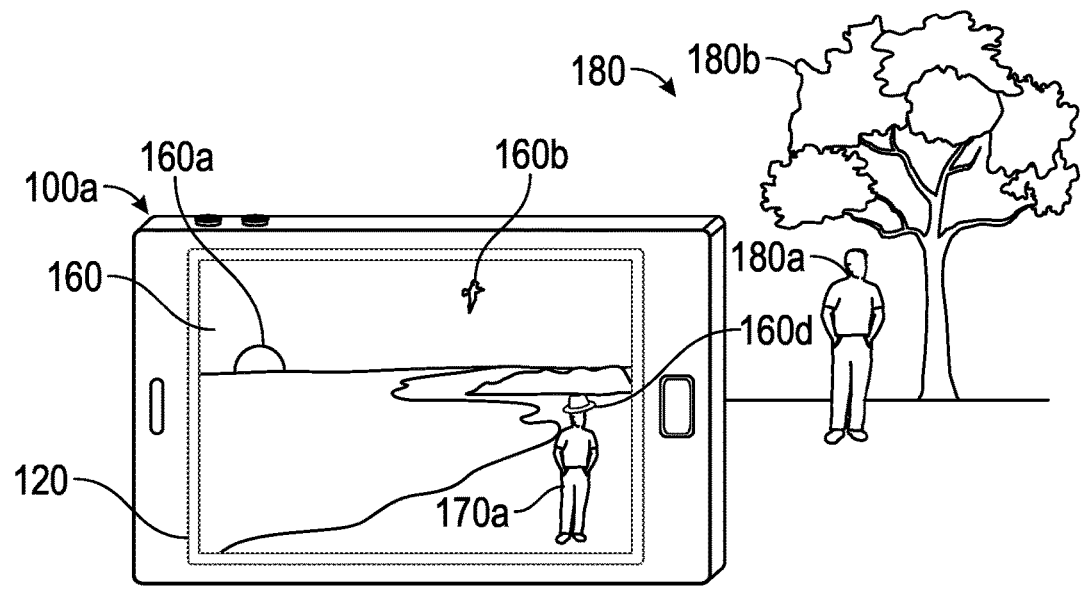

In some embodiments, system 100 is a mobile device, such as in the embodiments described with respect to device 100a in FIGS. 1C-1E. In some embodiments, system 100 is a head-mounted display (HMD) device, such as in the embodiments described with respect to device 100a in FIGS. 1F-1H. In some embodiments, system 100 is a wearable HUD device, such as in the embodiments described with respect to device 100a in FIG. 1I.

System 100 includes processor(s) 102 and memory(ies) 106. Processor(s) 102 include one or more general processors, one or more graphics processors, and/or one or more digital signal processors. In some embodiments, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some embodiments, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some embodiments, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some embodiments, system 100 includes touch-sensitive surface(s) 122 for receiving user inputs, such as tap inputs and swipe inputs. In some embodiments, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal—oxide—semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some embodiments, system 100 uses CCD sensors, event cameras, and depth sensors in combination to detect the physical environment around system 100. In some embodiments, image sensor(s) 108 include a first image sensor and a second image sensor. The first image sensor and the second image sensor are optionally configured to capture images of physical objects in the real environment from two distinct perspectives. In some embodiments, system 100 uses image sensor(s) 108 to receive user inputs, such as hand gestures. In some embodiments, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some embodiments, system 100 includes microphones(s) 112. System 100 uses microphone(s) 112 to detect sound from the user and/or the real environment of the user. In some embodiments, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

FIGS. 1C-1E illustrate embodiments of system 100 in the form of device 100*a*. In FIGS. 1C-1E, device 100*a* is a mobile device, such as a cellular phone. FIG. 1C illustrates device 100*a* carrying out a virtual reality technique. Device 100*a* is displaying, on display 120, a virtual environment 160 that includes virtual objects, such as sun 160*a*, birds 160*b*, and beach 160*c*. Both the displayed virtual environment 160 and virtual objects (e.g., 160*a*, 160*b*, 160*c*) of the virtual environment 160 are computer-generated imagery. Note that the virtual reality environment depicted in FIG. 1C does not include representations of physical objects from the real environment 180, such as physical person 180*a* and physical tree 180*b*, even though these elements of real environment 180 are within the field of view of image sensor(s) 108 of device 100*a*.

FIG. 1D illustrates device 100*a* carrying out a mixed reality technique, and in particular an augmented reality technique, using pass-through video. Device 100*a* is displaying, on display 120, a representation 170 of the real environment 180 with virtual objects. The representation 170 of the real environment 180 includes representation 170*a* of person 180*a* and representation 170*b* of tree 180*b*. For example, the device uses image sensor(s) 108 to capture images of the real environment 180 that are passed through for display on display 120. Device 100*a* overlays hat 160*d*, which is a virtual object generated by device 100*a*, on the head of the representation 170*a* of person 180*a*. Device 100*a* tracks the location and/or orientation of physical objects with respect to the position and/or orientation of device 100*a* to enable virtual objects to interact with physical objects from the real environment in the augmented reality environment. In this embodiment, device 100*a* accounts for movements of device 100*a* and person 180*a* to display hat 160*d* as being on the head of the representation 170*a* of person 180*a*, even as device 100*a* and person 180*a* move relative to one another.

FIG. 1E illustrates device 100*a* carrying out a mixed reality technique, and in particular an augmented virtuality technique. Device 100*a* is displaying, on display 120, a virtual environment 160 with representations of physical objects. The virtual environment 160 includes virtual objects (e.g., sun 160*a*, birds 160*b*) and representation 170*a* of person 180*a*. For example, device 100*a* uses image sensor(s) 108 to capture images of person 180*a* in real environment 180. Device 100*a* places representation 170*a* of person 180*a* in virtual environment 160 for display on display 120. Device 100*a* optionally tracks the location and/or orientation of physical objects with respect to the position and/or orientation of device 100*a* to enable virtual objects to interact with physical objects from real environment 180. In this embodiment, device 100*a* accounts for movements of device 100*a* and person 180*a* to display hat 160*d* as being on the head of representation 170*a* of person 180*a*. Notably, in this embodiment, device 100*a* does not display a representation of tree 180*b* even though tree 180*b* is also within the field of view of the image sensor(s) of device 100*a*, in carrying out the mixed reality technique.

Figure 1F:
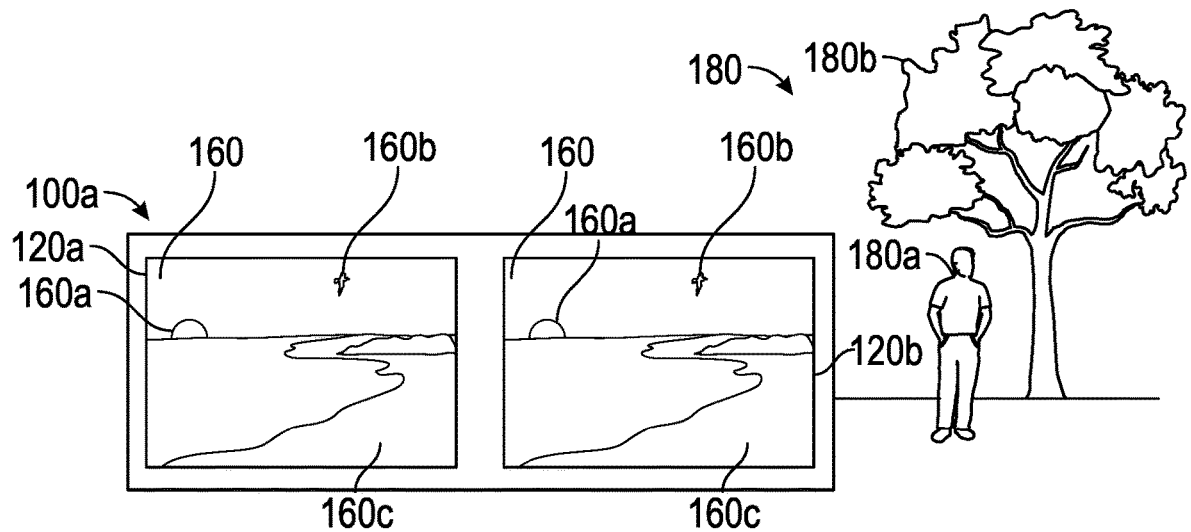
FIGS. 1F-1H illustrate embodiments of the system in the form of head-mounted display devices.
Figure 1G:
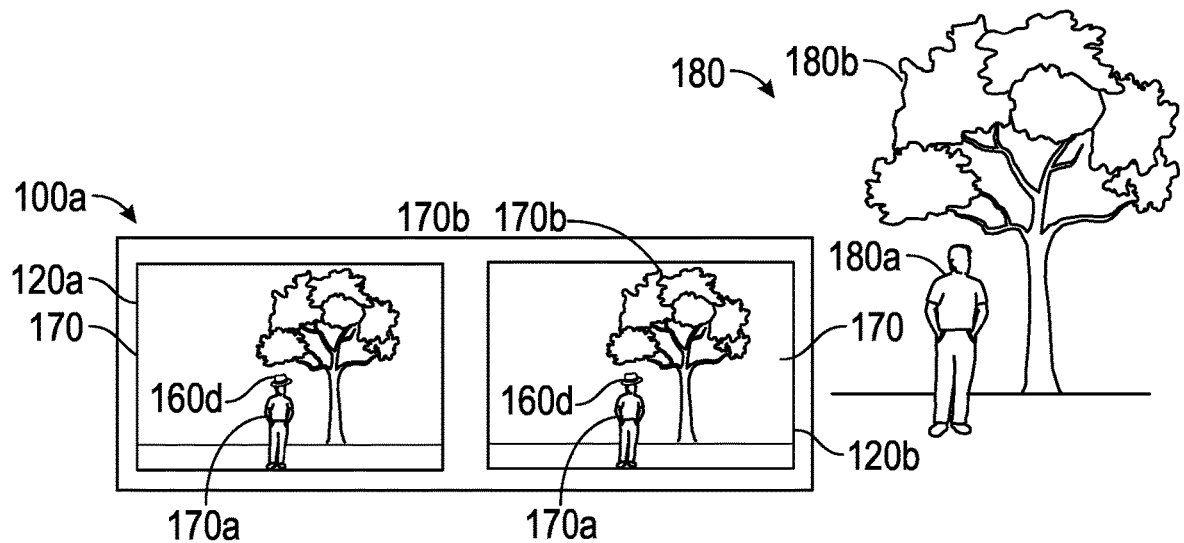
Figure 1H:
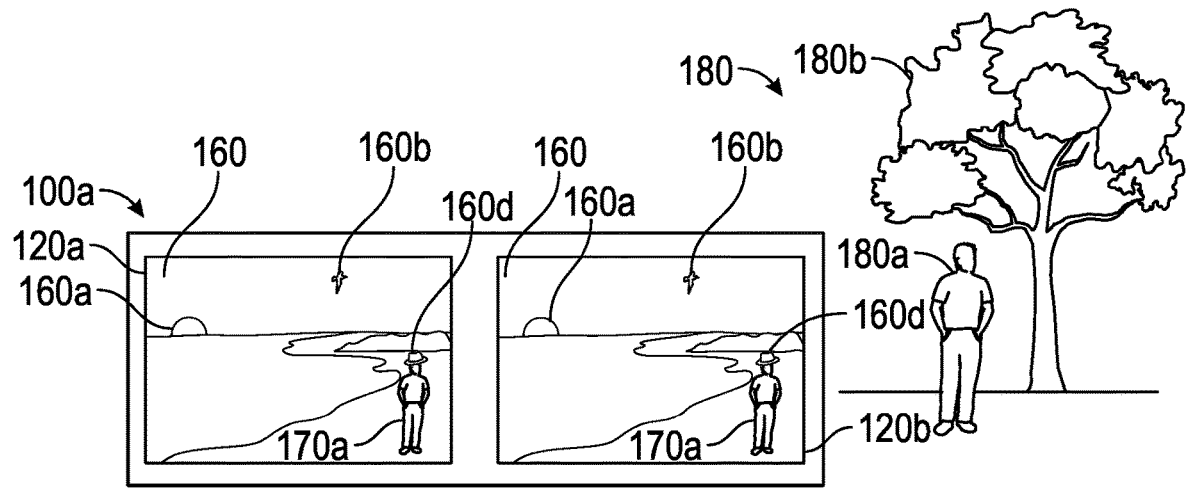

FIGS. 1F-1H illustrate embodiments of system 100 in the form of device 100*a*. In FIGS. 1F-1H, device 100*a* is a HMD device configured to be worn on the head of a user, with each eye of the user viewing a respective display 120*a* and 120*b*. FIG. 1F illustrates device 100*a* carrying out a virtual reality technique. Device 100*a* is displaying, on displays 120*a* and 120*b*, a virtual environment 160 that includes virtual objects, such as sun 160*a*, birds 160*b*, and beach 160*c*. The displayed virtual environment 160 and virtual objects (e.g., 160*a*, 160*b*, 160*c*) are computer-generated imagery. In this embodiment, device 100*a* simultaneously displays corresponding images on display 120*a* and display 120*b*. The corresponding images include the same virtual environment 160 and virtual objects (e.g., 160*a*, 160*b*, 160*c*) from different viewpoints, resulting in a parallax effect that provides a user with the illusion of depth of the objects on the displays. Note that the virtual reality environment depicted in FIG. 1F does not include representations of physical objects from the real environment, such as person 180*a* and tree 180*b* even though person 180*a* and tree 180*b* are within the field of view of the image sensor(s) of device 100*a*, in carrying out the virtual reality technique.

FIG. 1G illustrates device 100*a* carrying out an augmented reality technique using pass-through video. Device 100*a* is displaying, on displays 120*a* and 120*b*, a representation 170 of real environment 180 with virtual objects. The representation 170 of real environment 180 includes representation 170*a* of person 180*a* and representation 170*b* of tree 180*b*. For example, device 100*a* uses image sensor(s) 108 to capture images of the real environment 180 that are passed through for display on displays 120*a* and 120*b*. Device 100*a* is overlaying a computer-generated hat 160*d* (a virtual object) on the head of representation 170*a* of person 180*a* for display on each of displays 120*a* and 120*b*. Device 100*a* tracks the location and/or orientation of physical objects with respect to the position and/or orientation of device 100*a* to enable virtual objects to interact with physical objects from real environment 180. In this example, device 100*a* accounts for movements of device 100*a* and person 180*a* to display hat 160*d* as being on the head of representation 170*a* of person 180*a*.

FIG. 1H illustrates device 100*a* carrying out a mixed reality technique, and in particular an augmented virtuality technique, using pass-through video. Device 100*a* is displaying, on displays 120*a* and 120*b*, a virtual environment 160 with representations of physical objects. The virtual environment 160 includes virtual objects (e.g., sun 160*a*, birds 160*b*) and representation 170*a* of person 180*a*. For example, device 100*a* uses image sensor(s) 108 to capture images of person 180*a*. Device 100*a* places the representation 170*a* of the person 180*a* in the virtual environment for display on displays 120*a* and 120*b*. Device 100*a* optionally tracks the location and/or orientation of physical objects with respect to the position and/or orientation of device 100*a* to enable virtual objects to interact with physical objects from real environment 180. In this embodiment, device 100*a* accounts for movements of device 100*a* and person 180*a* to display hat 160*d* as being on the head of the representation 170*a* of person 180*a*. Notably, in this embodiment, device 100*a* does not display a representation of tree 180*b* even though tree 180*b* is also within the field of view of the image sensor(s) 108 of device 100*a*, in carrying out the mixed reality technique.

Figure 1I:
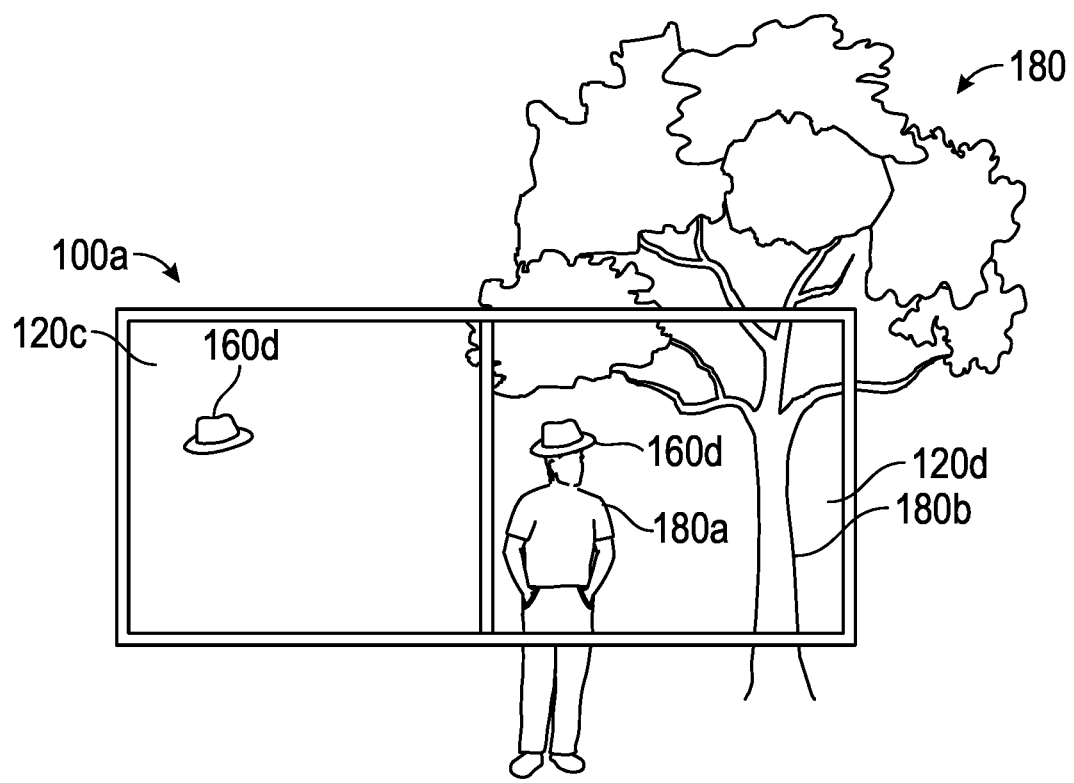
FIG. 1I illustrates an embodiment of the system in the form of a head-up display device.

FIG. 1I illustrates an embodiment of system 100 in the form of device 100*a*. In FIG. 1I, device 100*a* is a HUD device (e.g., a glasses device) configured to be worn on the head of a user, with each eye of the user viewing a respective heads-up display 120*c* and 120*d*. FIG. 1I illustrates device 100*a* carrying out an augmented reality technique using heads-up displays 120*c* and 120*d*. The heads-up displays 120*c* and 120*d* are (at least partially) transparent displays, thus allowing the user to view the real environment 180 in combination with heads-up displays 120*c* and 120*d*. Device 100*a* is displaying, on each of heads-up displays 120*c* and 120*d*, a virtual hat 160*d* (a virtual object). The device 100*a* tracks the location and/or orientation of physical objects in the real environment with respect to the position and/or orientation of device 100*a* and with respect to the position of the user's eyes to enable virtual objects to interact with physical objects from real environment 180. In this embodiment, device 100*a* accounts for movements of device 100*a*, movements of the user's eyes with respect to device 100*a*, and movements of person 180*a* to display hat 160*d* at locations on displays 120*c* and 120*d* such that it appears to the user that the hat 160*d* is on the head of person 180*a*.

The following description includes exemplary software systems (e.g., used by an electronic device) to carry out computer-generated reality techniques.

Conventional software systems, particularly operating systems (OS) that execute one or more applications, can be unsatisfactory for implementing a CGR system (e.g., one or more devices, such as 100*a*, 100*b*, and/or 100*c*, and stored instructions (e.g., software) for generating a CGR environment). In such conventional systems, applications each perform their own graphics rendering in their own process space, and each application presents a flat rendered image to the OS (e.g., a process of the OS) for output to a display. At the OS level, rendered flat images are presented on different areas of the display screen. Notably, these separate windows can visually overlap, but their depicted contents do not interact with each other, as the OS does not have information (e.g., properties, behavior, etc.) about the depicted contents that would be sufficient to perform realistic simulation and rendering of interaction between the contents in computer-generated reality. For example, in such conventional systems, an operating system would not have information sufficient to display the backside of a rendered image.

Additionally, in some conventional software systems, an installed application may have access to user information (e.g., input from the user) while running, sometimes even when executing in the background. Thus, information input into one application may be read by another application. Absent efforts to curate the population of installable applications, user privacy and security may be compromised.

This description includes exemplary software systems (e.g., used by an electronic device) to carry out computer-generated reality techniques.

1. Centralized Processing of Computer-Generated Reality Environments

A system (e.g., 100) can provide a spectrum of experiences ranging from augmented reality to virtual reality. For brevity, augmented reality, mixed reality, and virtual reality environments can be provided by system 100 (also referred to herein as CGR system 100), and are collectively referred to herein as CGR environments.

Embodiments of a software platform for providing a CGR environment are now described. The software platform provides a framework used by multiple processes to easily simulate and render rich CGR environments. Notably, the software platform enables a user interface that defines a 3D spatial interface, and includes content synchronized from one or more applications into a single shared simulation, thus moving beyond the conventional notion of displaying content for a single application at any given time. By not reducing content output from applications in this manner, the system can allow interaction between simulated virtual objects (virtual content) of one application and simulated elements (virtual content) of another application using a centralized process. Additionally, the software platform can be used to create simulations that are shared between multiple devices (e.g., each running one or more applications). For example, a plurality of users can experience (e.g., via a display on their respective device) a simulated CGR environment, where the users (who are operating separate devices in separate locales) can interact with one another in a shared virtual space on respective separate devices, wherein the shared virtual space (which can also be referred to as a shared virtual environment) includes content that is synchronized, thus creating the perception to each user that they are present in the same space.

In some embodiments, the software platform is implemented using an operating-system-level (OS-level) process for simulating and rendering content in the CGR environment, and one or more application-level processes for providing information related to the content to be simulated and rendered to the OS-level process. As used herein, an OS-level process is used to refer to a process with kernel-level execution privileges. As one of skill in the art would appreciate, an OS typically has a kernel, which is a function or program with control over the computing system that acts as an interface between applications and device hardware. For example, a process with kernel-level execution privileges typically has the highest-level privilege for accessing device resources, including the ability to access input/output (I/O) devices (e.g., display devices). As used herein, an application-level process is used to refer to a process that has lower execution privileges than that of a kernel-level process. For example, an application-level process (e.g., a third-party application) typically requests permission to access I/O devices from a process that has a higher privilege level higher than the application-level process. As one of skill in the art will appreciate, other types of device resource security schemes can be used to achieve the same or similar results (e.g., processes with varying levels of permissions and/or device resource accessibility), all of which are intended to be within the scope of this disclosure.

As described herein, in some embodiments, the software platform includes multiple software applications, which can include any combination of native applications (e.g., applications associated with and/or integrated into the operating system of the device) and third-party applications (e.g., applications associated with third-party service providers). In some embodiments, each of the application-level processes provides one or more CGR data objects to the OS-level process (a shared process), and the OS-level process in turn simulates (e.g., and renders) a single shared space CGR environment based on the received CGR data objects. This way, the OS-level process is able to simulate interactions between the various content provided by any number of applications in the CGR environment using a single shared simulation. For example, if the applications are represented by three-dimensional virtual objects in the simulated CGR environment and one of the three-dimensional virtual objects is a light source, the OS-level process is able to simulate the manner in which the light source illuminates the other three-dimensional virtual objects (e.g., from other applications) in the CGR environment. In contrast, if each of the application-level processes were to individually simulate and render corresponding three-dimensional virtual objects and provide the rendered images to the OS-level process, the OS-level process would need to alter and/or combine each of the rendered images accordingly such that the each of the rendered three-dimensional virtual object is properly illuminated. It should be appreciated that the latter approach is more complex, time-consuming, and resource-consuming.

Figure 2:
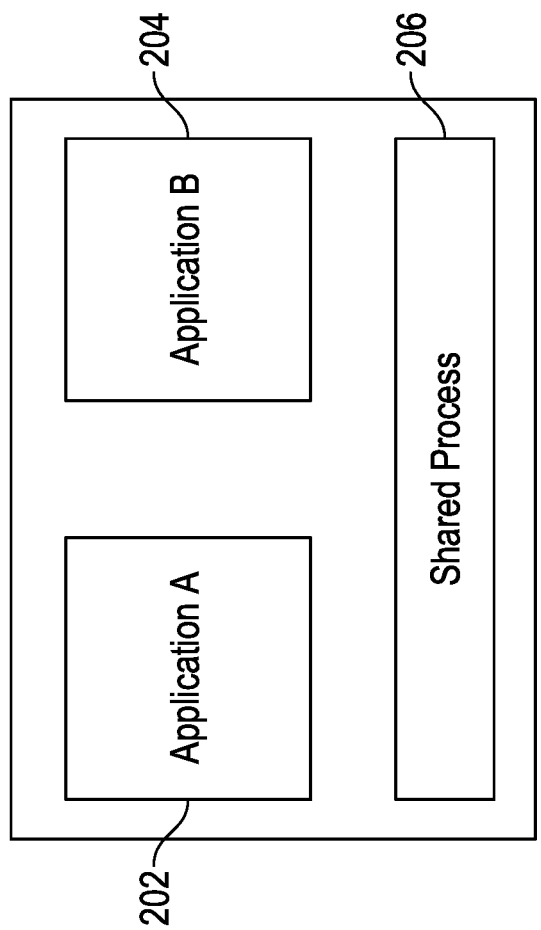
FIG. 2 depicts a block diagram of an exemplary shared process framework of a computer-generated reality platform in accordance with some embodiments.

FIG. 2 illustrates a block diagram depicting a multi-application structure. In some embodiments, upon a user input indicative of a request to launch a CGR environment, the CGR system initiates the OS-level process (e.g., shared process 206). The OS-level process simulates and renders an initial instance of the CGR environment (e.g., a three-dimensional representation of a room), for example, upon initialization or receiving content from one or more processes. Further, upon the user input indicative of a request to launch an application (e.g., application 202), the CGR system initiates an application-level process associated with the application, which in turn provides, to the OS-level process, information related to content to be simulated and rendered. The OS-level process receives the information from the application-level process and, based on the information, simulates and renders the CGR environment accordingly (e.g., simulating and rendering virtual content in the three-dimensional virtual environment). Furthermore, in some embodiments, a second application (e.g., application 204) executes and sends information to the same OS-level process (e.g., shared process 206), which simulates the CGR environment using information from both of the concurrently executing applications (e.g., 202 and 204). In some embodiments, the second application is executing on the same device as the first application, or at a remote device.

In some embodiments, the CGR environment is a shared space CGR environment, or a CGR environment that can include content from multiple different sources (e.g., applications, centralized processes, devices, users, etc.). By way of example, a CGR data object (described below) is created by an application-level process and provided to the OS-level process, which in turn renders the virtual object in the shared space CGR environment concurrently with one or more other virtual objects.

The centralized simulation and rendering of a CGR environment at runtime (e.g., by an OS-level process) in accordance with the techniques described herein can provide several benefits. For example, displaying content from various applications that can interact in the CGR environment is much more easily accomplished, as compared to conventional techniques (e.g., where an OS process receives image data that has already been rendered by an application). As another example, privacy and security can be improved, by limiting what is shared with applications executing in a shared CGR environment. As yet another example, virtual objects in a CGR environment can be easily captured for recording and/or playback, or for synchronizing with remote devices concurrently viewing a shared CGR environment. Further, benefits of the software platform in accordance with the techniques described herein can extend to the development of CGR environments, for example, by providing a streamlined framework for the development of CGR applications.

2. Data Structures for Computer-Generated Reality Simulations—CGR Data Objects

In some embodiments, a process (e.g., an application-level process) specifies content to be simulated and rendered to an OS-level process via one or more data objects (also referred to as "CGR data objects"). A CGR data object specifies various aspects (e.g., characteristics) of a three-dimensional representation of an entity (e.g., a virtual object such as a table, a light source, an avatar) in the CGR environment. As used herein with respect to computer-generated environments, "entity" refers to a virtual entity unless otherwise specified (e.g., such as by specifying it as a physical entity). In some embodiments, the CGR data object is a data structure that includes one or more of: property data, event data, and behavior data. In some embodiments, the CGR data object includes a reference (e.g., file path, URL, pointer, or the like) to data. For example, a CGR data object can include a reference to a 3D model (e.g., a property), wherein the 3D model data is stored outside of the CGR data object (e.g., elsewhere in device memory).

Property data can include any data necessary to simulate and render a three-dimensional representation of the entity in a particular state, such as: position, orientation (e.g., coordinates), shape, size, texture, mass, animation, sound, and material. In some embodiments, a centralized process (e.g., an OS-level process) includes one or more subsystems, such as subsystems directed to: graphics, audio, physics simulation, animation, and AI. In some embodiments, property data includes data that is processed by the subsystems. For example, property data can include: 3D models, sound effects data, collision shapes (e.g., convex hulls), constraints (e.g., joints, motors), material properties (e.g., friction, restitution), animations (e.g., keyframed data), current position, target position, and a decision tree. In some embodiments, a graphics subsystem renders the 3D models. In some embodiments, an audio subsystem plays the sound effects. In some embodiments, a physics subsystem simulates dynamics using the collision shapes, constraints, and material properties. In some embodiments, an animation subsystem plays back the animations using the keyframed data. In some embodiments, an AI subsystem calculates a path based on the current position and the target position and/or evaluates the decision tree. In some embodiments, the entity represented by the CGR data object corresponds to a physical entity in the physical environment, and the CGR system obtains the property data based on the characteristics of the physical entity (e.g., via visual inspection of a captured image, using machine learning). Property data can further include settings associated with the entity, such as a name and access privilege data.

Event data defines state changes that can trigger responses by the entity. For example, the event data can specify a touch event (e.g., the entity is responsive to a touch input), a click event (e.g., the entity is responsive to a click input), etc.

Behavior data specifies behaviors that the entity is capable of exhibiting. In some embodiments, behavior data includes instructions that control the execution and flow of data between subsystems for simulating an entity represented by a CGR data object. For example, a CGR data object can include data specifying that the corresponding virtual object has a "physics behavior", which indicates to a centralized process that the CGR data object should be processed as part of the shared physics simulation (e.g., processed by the physics subsystem, so that other virtual objects in the simulation can collide with it and bounce off). This "behavior" is a piece of custom or predefined logic which can add or remove the CGR data object to or from a subsystem simulation, and can read the simulation result to update the CGR data object (e.g., update a position property of the CGR data object after processing by the physics subsystem). Examples of other behaviors include "graphics behavior", "audio behavior", "animation behavior", "AI behavior", or the like. Additional examples of behaviors include "StaticObject" behavior (e.g., for a building), "DynamicObject" behavior (e.g., for a ball), and "Animal" behavior (e.g., for a dog). For example, a CGR data object can include "StaticObject" behavior, which defines a virtual object that has a physical representation (e.g., collision shape, material), but is immovable and is not simulated by the physics system—it is only rendered by the graphics system. For example, a CGR data object can include "DynamicObject" behavior, which defines a virtual object that that has a physical representation (e.g., collision shape, material) that is simulated by the physics subsystem—the results of the physics simulation are then used to update the graphics model, which is rendered by the graphics system. If there is a collision, it can trigger a sound effect, which is played back by the audio subsystem. For example, a CGR data object can include "Animal" behavior, which causes an AI subsystem to evaluate a decision tree defining animal-like behaviors (e.g., for simulating humans, dogs, cats, etc.). The decision tree evaluation can define which animations (e.g., 3D model poses) are played back by the animation system (e.g., at a given time, in response to a given interaction, etc.). The resulting animation poses drive the collision shapes in the physics simulation and the model rendered by the graphics subsystem. Behaviors can include being able to be picked up, being able to be pushed, being able to collide with another three-dimensional representation in the CGR environment, and being able to behave in accordance with gravity. The behavior data can specify complex behaviors, such as human behaviors, canine behaviors, etc.

In some embodiments, for system integrity, CGR data objects cannot specify arbitrary code that is executed in the centralized process (e.g., OS-level process). However, a centralized process can provide access to a library of secure, predefined behaviors that CGR data objects can utilize (e.g., by including a reference to one or more of the behaviors). In such example, "behaviors" are predefined pieces of logic (e.g., 'path following logic' in the centralized process) that can be attached to CGR data objects (e.g., invoked by including a particular behavior or reference in the data object, such as "DynamicObject" or "Animal"). In some embodiments, behavior data can include a custom (e.g., user-defined) script or logic that defines an AI behavior (e.g., used by an AI subsystem). In some embodiments, the property data of the CGR data object includes one or more parameters (e.g., movement target, speed) and/or states for the AI behavior (e.g., which can be referred to as "AI properties").

Figure 3:
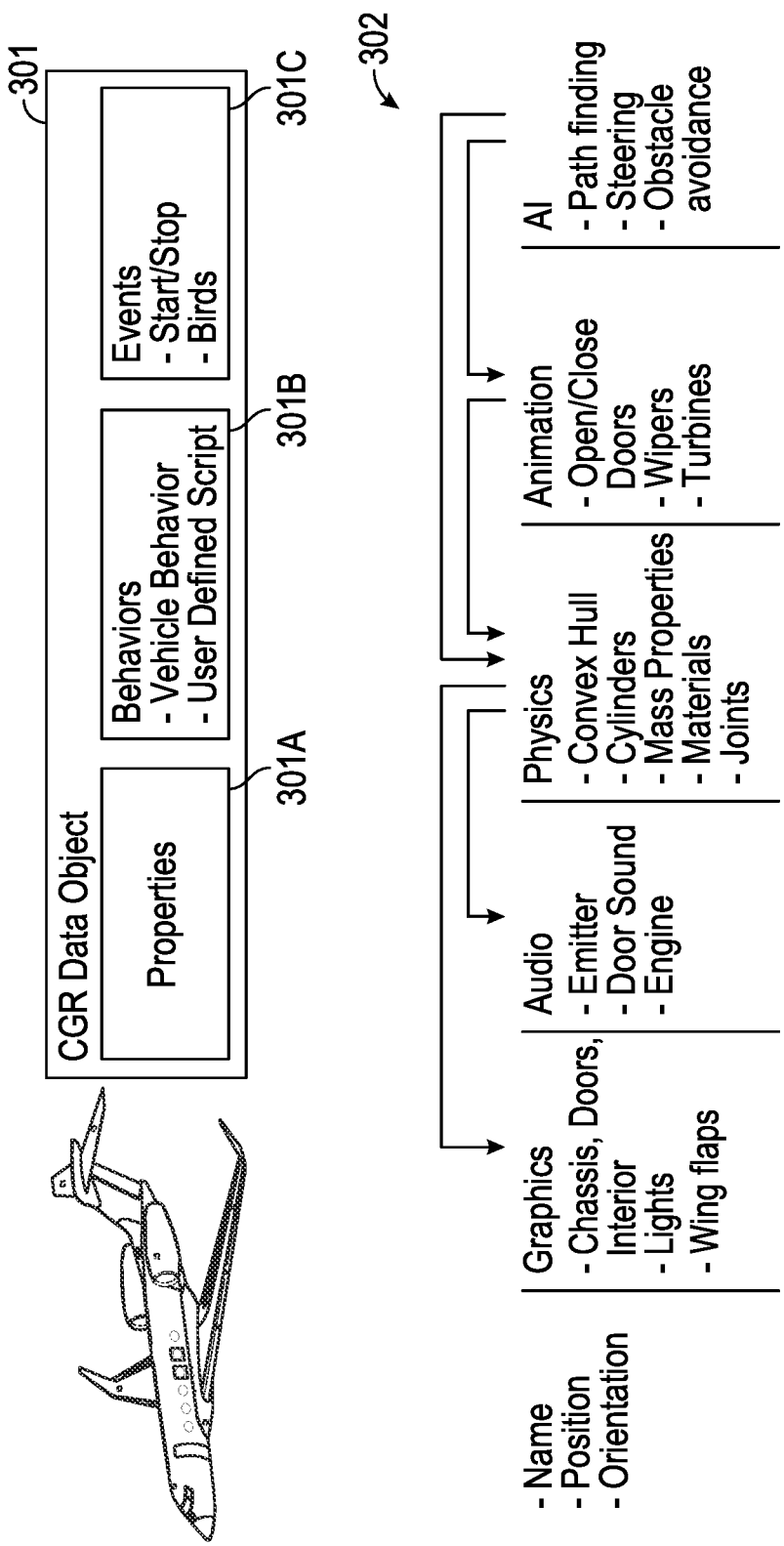
FIG. 3 depicts the contents of an exemplary data object of a computer-generated reality platform in accordance with some embodiments.

FIG. 3 illustrates a block diagram of an exemplary CGR data object. In the embodiment depicted, the CGR data object 301 defines a virtual airplane to be simulated in a CGR environment. In some embodiments, a CGR data object includes one or more of: one or more properties, one more behaviors, and one or more events. For example, CGR data object 301 includes properties data 301A (e.g., defining the properties of the airplane), behavior data 301B (e.g., defining behaviors that will be exhibited by the airplane), and event data 301C (e.g., defining events that trigger responses by the airplane). Table 302 includes detailed information about the properties data 301A. For example, properties data 301A includes the following data relevant to animating the virtual airplane: data for animating the opening and closing of the door of the virtual airplane, data for animating the movement of the windshield wipers of the airplane, and data for animating the spinning of the engine turbines of the airplane. Properties data 301A also includes basic information about the airplane, such as a name, a position of the airplane, and an orientation of the airplane (e.g., indicating which direction of the airplane is the front). Other property data shown in table 302 includes graphics data, audio data, physics data, and artificial intelligence (AI) data. This data can be used by appropriate simulation and rendering process(es) (e.g., subsystems) in order to create the virtual airplane in the CGR environment. As illustrated by the arrows, the various types of property data can be interrelated and relevant to multiple simulation processes (e.g., used by multiple subsystems, as described above). For example, the obstacle avoidance AI data will rely on the data of the airplane's physical properties (e.g., so that an AI calculation can determine when the airplane will contact an obstacle, and use this information to avoid the obstacle).

In some embodiments, behavior data includes a script that defines the behavior of the virtual object. For instance, behavior data 301B includes a user-defined script defining the virtual airplane's behavior (e.g., within a CGR environment). For example, the user-defined script can make the virtual airplane drive around for a period of one minute, avoid obstacles while driving, park for a period of one minute, move its wing flaps, take off and fly around, and land after flying for 5 minutes.

In some embodiments, event data includes events that trigger a response from the virtual object. For instance, event data 301C includes an event named "birds", which defines how the virtual airplane will respond to an impending bird strike. For example, such a response can include altering the direction of travel, showing indentations to the airplane's nose, grounding the airplane, and/or ceasing to spin the engine turbines of the airplane.

In some embodiments, a virtual object represents an application itself—when the application is run, it is exhibited as a three-dimensional virtual object in the CGR environment (e.g., that can be interacted with). Thus, interaction with the visual representation representing the application is the interface with the application, and can cause a sub-process of the application to be executed or otherwise become active.

A CGR data object can be created by either an application process or an OS-level process. For example, a virtual environment that simulates a user's nearby physical environment can include a virtual object created by an application (e.g., a lamp that does not correspond to a physical entity in the physical environment) and the OS-level process can contribute a CGR data object representing a virtual rendering of a table (e.g., that does correspond to a physical entity in the physical environment). Thus, the use of CGR data objects as described herein can allow content to be contributed to a shared space (e.g., being rendered by the OS-level process), regardless of the source of the CGR data object. By extension, as will be discussed in greater detail below, a CGR data object from a remote source (e.g., an application executing on a different device by a different OS-level process) can additionally or alternatively be rendered in the shared space of the OS-level process.

CGR data objects are lightweight data structures, for example, that describe properties and behaviors of objects that will be placed in a CGR environment. Accordingly, CGR data objects are easily and efficiently shared between processes (e.g., from an application-level processes to an OS-level process, using IPC) and devices (e.g., between remote devices simulating the presence of two remote users in a virtual environment simulated at both devices). The lightweight nature of CGR data objects can allow what would otherwise be a calculation-heavy simulation and rendering of the CGR environment to be performed by a single, centralized process (e.g., an OS-level process) that receives the CGR data objects. Information not necessary for defining the virtual object can be omitted, such as rendering routines or information found in a common library.

CGR data objects are used to represent virtual objects in a CGR environment (e.g., in a mixed reality environment). As described above, CGR data objects include data for simulating and rendering virtual objects. For example, a simulation of a virtual room can have CGR data objects respectively representing each of the room, the table in the room, an avatar representing the user present in the room, procedural content in the room, and the like.

In some embodiments, CGR data objects include additional data. In some embodiments, CGR data objects include one or more privacy-related properties. For example, a CGR data object can include a property that indicates that the corresponding virtual object should not be shared (e.g., not be visible to other users). For instance, if a first user invites a second user into a shared virtual space in a CGR environment that simulates the first user's home, there are certain physical objects in the first user's home that they would not want to be visible to the second user (e.g., a business card laying on a table) in the virtual environment that simulates the user's home. Accordingly, CGR data objects representing virtual objects corresponding to those certain physical objects can include (e.g., by default or designated so by a user) a property that prevents such virtual objects from being shared. In some embodiments, a virtual object can be shareable, but have one or more properties (e.g., less than all of its properties) that are designated as not shareable in the representative CGR data object. For example, in the case of a business card, texture of the virtual object representing the card can be designated as a non-shareable property (e.g., the second user would be shown the shape of the card, but name and phone information are not reproduced, for example, by substituting the graphic content for a generic texture, such as a solid color). In some embodiments, the software platform can share properties of CGR data objects with other users selectively, such as with user-based permission. Thus, a portion or all of a CGR data object (representing a virtual object) can be shared with a designated trusted user (e.g., a spouse), but not with an untrusted user (e.g., an acquaintance), as specified by the user.

It should be noted that the privacy-related properties can be used not only to prevent sharing of content with other users, but also to prevent unauthorized or unnecessary sharing with other applications. Due to the framework provided by the software platform, an application does not need information about the CGR environment in order to contribute content to the CGR environment. Rather, the application passes one or more CGR data objects that define objective properties and behaviors of virtual objects, to a centralized OS-level process (e.g., via IPC) which performs the simulation and rendering. Thus, the OS-level process has information about the CGR environment, including any other content contributed by other applications running therein, but such information is not necessarily shared with all applications. However, in the case that an application is provided access to data about other virtual objects in the CGR environment (e.g., by the user), the scope of what is shared between applications can be controlled in the same way as described above with respect to other devices. For example, an application might be provided information that a person is present in the room with the user, but the application is not provided detailed visual information (e.g., depiction of facial features) of the person.

The foregoing examples are intended to assist in an understanding of the present technology. It is noted that the present disclosure relates to underlying technologies that can be used to communicate information. Out of an abundance of caution, entities that employ these technologies to convey information that may be viewed as personal information data are advised to comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. Indeed, the present disclosure contemplates embodiments in which information may be controlled to improve privacy. Nonetheless, the present technology can be configured to allow users to select to "opt in" or "opt out" of participation. It is the intent of the present disclosure to provide technologies improving the security of data that they consider to be personal, whether that is a business card, a calendar of events, and so forth.

Other features of the CGR data object include the ability to be synchronized across multiple devices. For example, in a CGR environment that is concurrently being rendered by two or more remote devices, the virtual content (represented by CGR data objects) within the CGR environment can be synchronized so that changes are seen in both simulations. Accordingly, in some embodiments, the software platform synchronizes properties between devices (e.g., at regular intervals, in response to a change, etc.). For example, the software platform can save a snapshot of a CGR data object at a given point in time (or over a period of time), and send it to other devices sharing in the same simulation. The software platform on the remote device can receive and process the data (e.g., which can include updating an instance of the CGR data object, stored at the receiving device, with received data), and update a simulation at the second device accordingly. In some embodiments, the simulation of the CGR data object is performed at each device, but one simulation has authority over the others (e.g., the host user that invited the other users (devices) into the CGR environment or shared virtual space). Synchronization of CGR data objects are described in more detail below with respect to FIG. 4C, which depicts an exemplary shared virtual space session between two devices.

3. CGR System Software Platform

Figure 4A:
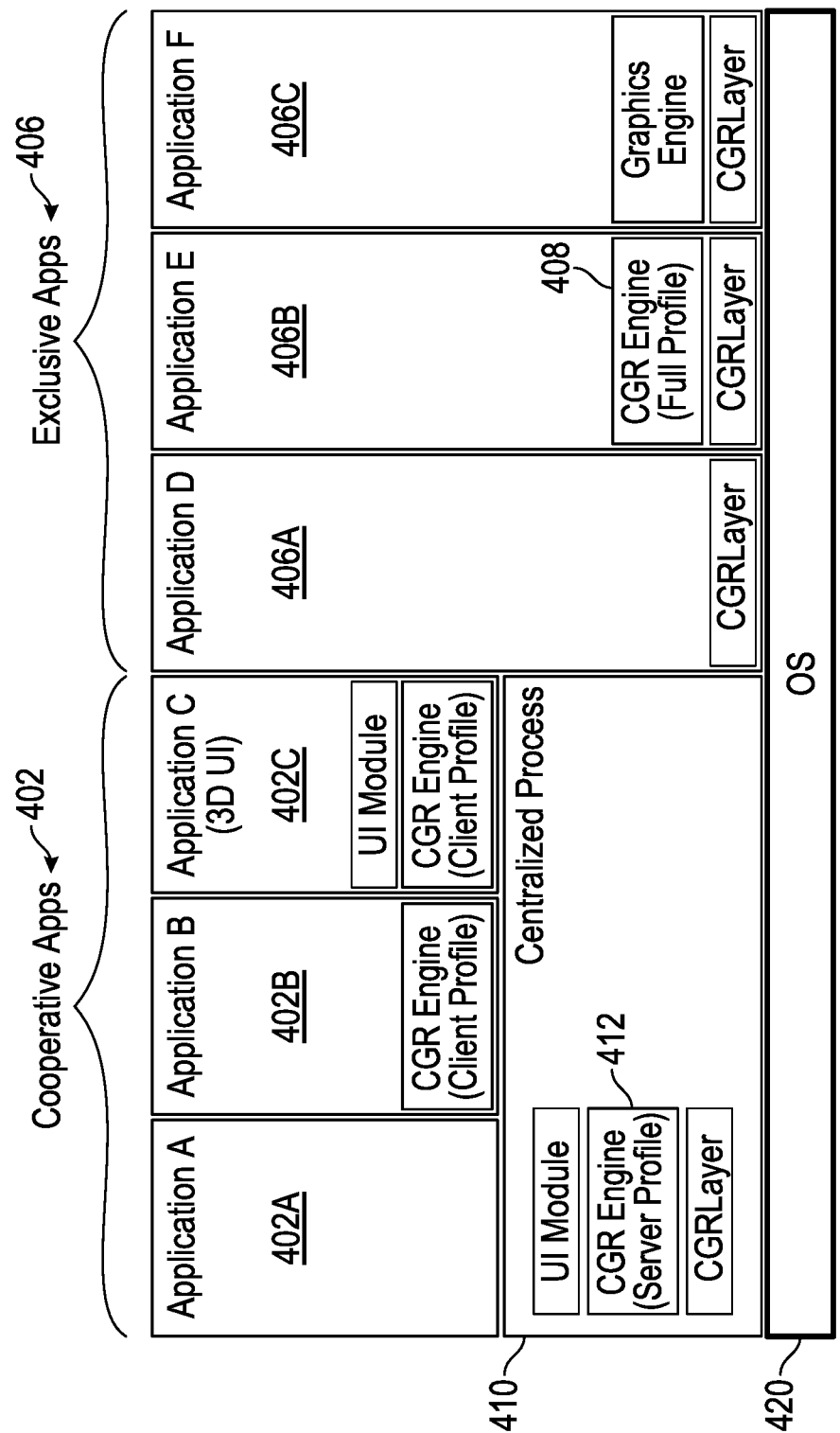
FIGS. 4A-4C depict exemplary block diagrams of components of a computer-generated reality platform in accordance with some embodiments.

FIG. 4A illustrates an exemplary block diagram of software platform components in accordance with some embodiments. In some embodiments, CGR data objects are simulated by a component of the software platform, which is referred to as a "CGR engine". In some embodiments, the CGR engine includes instructions for performing simulation (e.g., of virtual object physics, collisions, artificial intelligence (AI), behaviors, and the like) involving the CGR data objects. In some embodiments, simulating includes performing one or more computations to create a representation (e.g., of a CGR environment, and/or one or more data objects). In some embodiments, simulating (e.g., of a CGR environment, and/or one or more data objects) includes maintaining the representation in memory. In some embodiments, the CGR engine renders simulated content for display. For example, the CGR engine can include a graphics renderer that receives graphics information from one or more applications and renders virtual objects for display based on the received graphics information.

The CGR engine can be implemented as a sub-process of other processes of the software platform. As described herein, for example, the CGR engine can be part of the application-level process, the OS-level process, or both (e.g., running in different profile modes). In some embodiments, the particular actions performed by the CGR engine can depend on the type of process implementing the CGR engine. Further, the particular functionality of a CGR engine can depend on the profile mode it is running in, for example, which in turn can depend on the type of process it is a part of. An application can be categorized as a "cooperative" type or an "exclusive" type application, which can affect which profile mode the CGR engine executes in. In an exemplary implementation of a CGR system, the software platform allows for a CGR engine that can run in three different profiles to support the various scenarios referenced above. Profiles may include client profile, server profile, full profiles. Profiles used to support the software platform are described in further detail below.

The block diagram of FIG. 4A includes several different process types. FIG. 4A includes cooperative applications 402, which include Application A (402A), Application B (402B), and Application C (402C). Each application can be considered a process, and each process can have any number of sub-processes (or threads). Applications B and C each include a CGR engine (running in a client profile). As shown, applications 402A-402C are each in communication with centralized process 410 (e.g., an OS-level process). Such communication can include, for example, exchange of information relevant for simulating and processing CGR content.

Centralized process 410 includes a CGR engine (running in a server profile). In some embodiments, centralized process is a shared process (e.g., shared process 206). As described in more detail below, the server and client profile CGR engine components manage the exchange and simulation of CGR virtual objects (e.g., three-dimensional objects).

FIG. 4A also includes exclusive applications 406, which include Application D (406A), Application E (406B), and Application F (406C). Application E includes a CGR engine (running in a full profile). As shown, applications 406A-406C are each in communication with OS 420 but not with the centralized process 410. The processes (and their components) illustrated in FIG. 4A are described in greater detail below.

In some embodiments, the CGR engine runs in a "server profile" mode. In a server profile mode, CGR data objects can be defined locally or remotely. For example, two devices, remote from each other, can concurrently render a computer-generated reality environment shared virtual space, with each executing a CGR engine in the server profile mode. In the server profile mode, the CGR engine can render CGR data objects created locally (e.g., by an OS-level process or application-level process of the local device) or created remotely (e.g., by an OS-level process or application-level process of the remote device). Generally speaking, an OS-level process will run the CGR engine in a server profile mode. For instance, the OS-level process can receive CGR data objects from multiple local and remote application-level processes, and render a CGR environment that includes visual representations of each of the CGR data objects received. Application-level processes will run a lightweight version of the CGR engine in a client profile, as described below. Thus, the CGR engine running the server profile acts as the server in a server-client relationship (e.g., with a CGR engine running in the client profile, described below).

In some embodiments, the CGR engine runs in a "client profile" mode. In a client profile mode, the CGR engine defines CGR data objects, but the CGR engine does not control simulation (e.g., does not perform simulation and rendering computations), and passes the CGR data object to a process running the CGR engine in a server profile. Such a mode allows, for instance, one or more concurrently-executing applications to contribute CGR data objects to a shared simulation space, which is then rendered by another process (e.g., an OS-level process running the CGR engine in a server profile). In this way, the CGR engine in the client profile behaves as a thin client, passing information to a server (the CGR engine in a server profile) for processing (e.g., simulation and rendering). For example, a first application-level process can run the CGR engine in the client profile mode and define a CGR data object representing a lamp in an augmented reality CGR space, and a second application-level process can run a CGR engine in the client profile mode and define a CGR data object representing a calculator in the augmented reality CGR space. The lamp and calculator CGR data objects can be rendered by an OS-level process (e.g., that is a shared or centralized process to both the first and second application-level processes) running a CGR engine in the server profile mode, rendering the lamp and the calculator for display to the user. Moreover, the virtual objects can interact—the lamp's illumination can be taken into account when rendering the visual appearance of the calculator (e.g., color of the lamp's illumination affects the displayed color of the calculator object in the CGR environment).

In some embodiments, a process (e.g., a cooperative application) running the CGR engine in the client profile uses interprocess communication (which may also be referred to as "inter-process communication" or IPC) to pass CGR data objects to a centralized process (e.g., OS-level process) that controls the simulation. CGR data objects are then simulated by the centralized process (e.g., remotely from the application). In some embodiments, the centralized process uses IPC to provide the application process with updated data for CGR data objects (e.g., after simulation).

In some embodiments, the CGR engine runs in a "full profile" mode. In a full profile mode, the CGR engine has full control over the simulation of a CGR environment (e.g., comprised of CGR data objects). For example, a CGR engine running in full profile can both define new CGR data objects to be added to a computer-generated reality environment, and actually perform the rendering and simulation of said new CGR data objects. Generally speaking, an application running in an "exclusive" mode (also referred to as an "exclusive" type application), having full control over the computer-generated reality environment simulation and rendering, will run the CGR engine in a full profile mode. An application running in exclusive mode has control over the display output, and thus another application (e.g., cooperative or exclusive) cannot contribute content to the displayed CGR environment of the exclusive application.

As mentioned generally above, applications can either share a cooperative simulation or have exclusive control of a simulation. These applications are categorized as "cooperative" type and "exclusive" type applications, respectively.

A cooperative application is an application (e.g., a tool) that can be run simultaneously with other cooperative applications, and share a simulation. For example, a simulated shared space can concurrently include renderings of a lamp virtual object contributed by a first cooperative application and a calculator contributed by a second cooperative application. A cooperative application can add new CGR data objects to the simulation, but does not control the simulation (e.g., it runs the CGR engine in a client profile and passes data objects representing virtual content to a shared/centralized process). Rather, the shared space (virtual environment) is simulated by a centralized process (e.g., an OS-level process running the CGR engine in a server profile). In some embodiments, the cooperative applications are represented as three-dimensional virtual objects (e.g., desk, chair, small spreadsheet app, calculator, light source) that are simulated in the shared space. In some embodiments, a single application-level process can include multiple cooperative applications. For example, an office-suite application (e.g., a "parent application") can include a set of software tools that are each a separate application, including a calculator application and a spreadsheet application. These separate "sub-applications" can still run their own local simulations, but interactions (e.g., physical collisions) with other virtual objects (e.g., from a different application than the office-suite application) are limited.

In some embodiments, cooperative applications can execute application-specific processes, for example, that are related to internal functions of the application that do not affect interaction with other cooperative applications (e.g., other virtual content in the CGR environment). For example, a spreadsheet application can perform arithmetic calculations on data in an opened spreadsheet at the application-level (e.g., as a sub-process of the executing application). Certain calculations (and their results) are handled by the application process, and the application only shares with the centralized process information that is relevant to simulation of interactions with other applications. In contrast, an interaction of a three-dimensional virtual object representing the spreadsheet application with a three-dimensional virtual object representing another application would be processed (e.g., simulated and rendered) by the OS-level process.

An exclusive application is an application that controls the entirety of a CGR simulation when executing. An exclusive application controls and simulates and renders its own CGR environment. Thus, for example, applications other than the exclusive application generally do not contribute content to the simulation controlled by the exclusive application. In some embodiments, an exclusive type application can include a CGR engine component configured to operate in a full profile mode (e.g., to handle simulation of CGR data objects).

In some embodiments, exclusive applications and cooperative applications are implemented as different types of applications. That is, a cooperative application cannot run in an exclusive mode, and an exclusive application cannot run in a cooperative mode. In some embodiments, whether an application behaves as a cooperative application or as an exclusive application depends on an execution state of the application. For example, an application could run in either a cooperative or an exclusive mode (or transition between modes), depending on an execution state of the application.

The software platform as described herein is applicable for simulating virtual environments (e.g., CGR environments) that can be categorized as VR or MR. In some embodiments, all content for display is rendered in 3D. For example, any content, whether originating from an OS-level process or an application-level process, are rendered for display in a 3D shared space environment. In some embodiments, 2D content can be included in a 3D simulation (e.g., but appear as substantially planar).

Figure 4B:
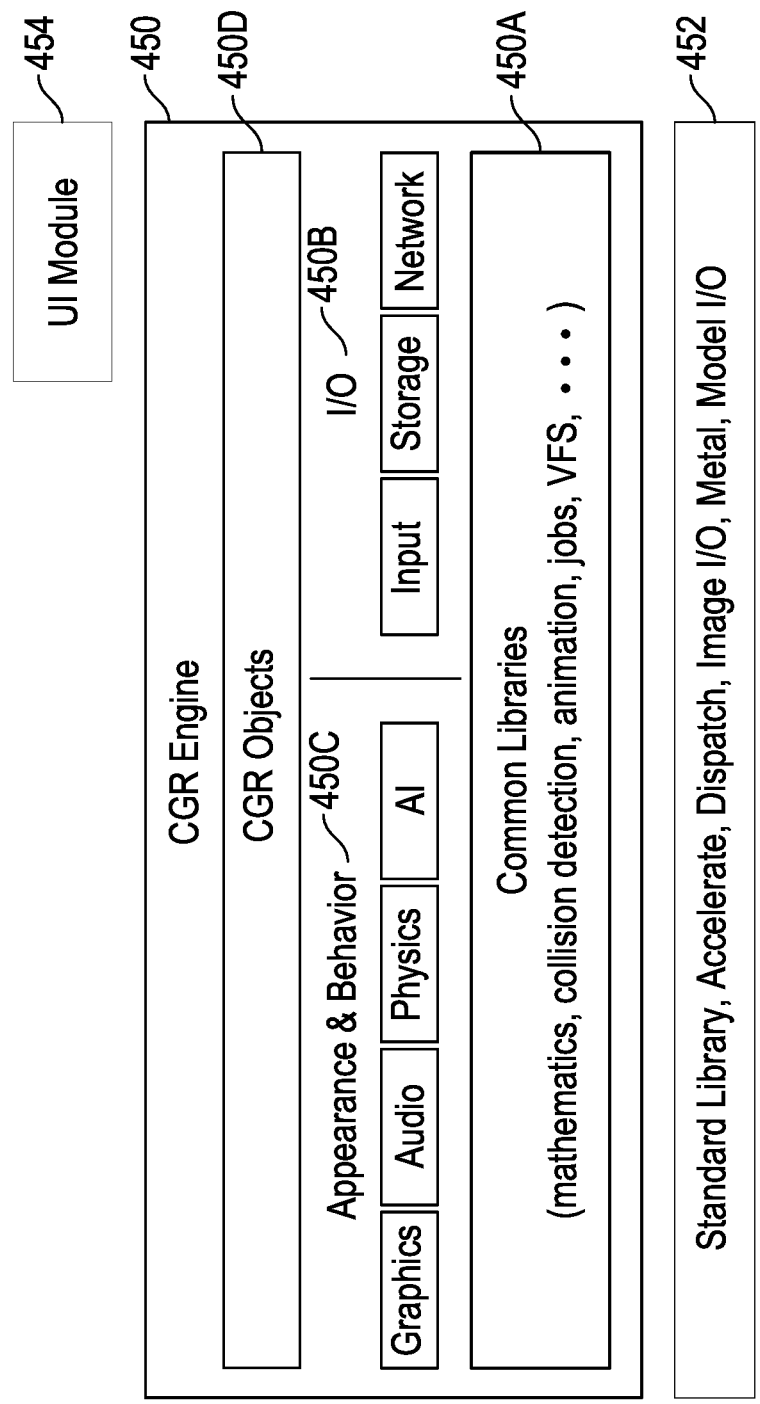

FIG. 4B illustrates an exemplary block diagram of a runtime program stack in accordance with some embodiments of the software platform. As shown, a user interface module 454 executes in communication with the CGR engine. The user interface module, for example, can define user interface controls as CGR data objects, which are simulated and rendered through the CGR engine. The CGR engine 450 executes in communication with the OS libraries

452. Exemplary OS libraries include one or more of: a library for interfacing with processing hardware, a library for interfacing with graphics hardware, a library for handling concurrent code execution, a library for a programming language, a library for working with 3D model data, an application programming interface (API) library, or the like.

As described above, in some embodiments the CGR engine (e.g., in the server profile mode) performs both simulation and rendering. The CGR engine can be supported by (e.g., include) one or more subsystems or modules (e.g., processes or sub-processes), for example, that perform functions supporting the simulation and rendering of CGR environments. In some embodiments, one or more of these subsystems run in parallel.

In some embodiments, subsystems of the CGR engine are built on a set of common libraries (e.g., 450A of FIG. 4B). Exemplary common libraries include resources related to one or more of: mathematics, collision detection, animation, job handling, virtual file systems (VFS), among others. The mathematics library can include functions specific to CGR simulation. The collision detection library can provide routines to accelerate graphics (e.g., frustum culling), occlusion information for audio, collision contact information for physics, visibility and navigation information for AI, among others. The animation library can include functions that drive user interface (UI) animations as well as virtual object and character animation. The job handling library can include routines tailored to particular devices or hardware, enabling each subsystem to run in parallel with the appropriate priorities. In some embodiments, each subsystem can split their internal work into further jobs. The virtual file system (VFS) library can simplify input and output (I/O) for applications. For example, the VFS library can enable applications using the CGR engine to easily reference an existing resource without regards to whether the resource is loaded from hard disk, streamed from the network, or cached locally in memory. Accordingly, implementing the CGR engine using a set of common libraries allows CGR data objects to be more compact in size (e.g., limited to describing features that define the virtual objects, rather than including extensive data related to functions for performing the simulation and/or rendering of such virtual objects).

Exemplary subsystem processes are now described. However, such embodiments are not intended to be exhaustive. Moreover, in some embodiments, the software platform allows subsystems to be implemented using various third-party components from one or more third-party providers.

An exemplary subsystem is an input/output (I/O) subsystem (e.g., 450B of FIG. 4B). In some embodiments, the I/O subsystem handles the input, output, and storage of data used by the CGR engine. For example, the I/O subsystem can perform storing and loading of CGR scene data (e.g., retrieve CGR data objects from memory), recording of CGR scene data (e.g., capture CGR scene data (CGR data objects) at a particular time), playback of CGR scene data (e.g., retrieve the appropriate CGR scene data for a particular time, for simulation and rendering by the CGR engine), and synchronization of CGR scene data over a network (e.g., handling the exchange of CGR data object data and associated changes so that a shared virtual space between two users maintains synchronization). In the case of synchronization, for example, the I/O subsystem can ensure that a change in the CGR environment of one user (e.g., at a first device) is reflected in the CGR environment of another user (e.g., at a second device), where each device is simulating and rendering a shared CGR environment (e.g., a shared virtual space).

Another exemplary subsystem is an appearance and behavior (A&B) subsystem (e.g., 450C of FIG. 4B). In some embodiments, the A&B subsystem can refer to one or more subsystems running in parallel that can include: a graphics subsystem (e.g., rendering engine), an audio subsystem (e.g., for processing 3D spatial audio), a physics simulation subsystem, and an artificial intelligence subsystem. The A&B subsystem performs the core functions for simulating and rendering virtual objects in a CGR environment. The A&B subsystem can access appropriate data (e.g., appearance information (from CGR data objects) for the graphics subsystem) and perform the appropriate calculations for creating the CGR environment simulation. The A&B subsystem can interface with CGR data objects through an "object layer" subsystem (e.g., 450D of FIG. 4B) that passes information to and from the A&B subsystem. For example, when calculations from a physics simulation result in a change to a property of a virtual object represented by a CGR data object, the data in the CGR data object needs to be updated in memory—the A&B subsystem communicates with the CGR data objects through the object layer, which allows the appropriate CGR data object to be updated. In some embodiments, a process or application outputs data to an image buffer (e.g., referred to as a CGRLayer). The "layers" of several applications can then be combined using 2D image compositing. For example, the centralized process draws image data representing a 3D environment into the CGRLayer, and another process can draw OS notifications (e.g., to be superimposed over the display of the 3D environment) into another layer. The OS would then combine both layers and send the composited/blended image to the display.

4. Recording and Playback of Computer-Generated Reality Environments

As mentioned above, the software platform is capable of storing a snapshot of a CGR environment at a given time while providing the CGR environment. In some embodiments, this is achieved by storing CGR data objects and their properties at a particular time (or over a period of time). Due to the efficiency of the data structure of CGR data objects, such snapshots can be easily stored or transmitted. Conversely, the software platform can retrieve a snapshot from memory, and recreate a CGR environment using the CGR data objects recorded in the snapshot. For example, an instance of the CGR engine can perform simulation and rendering using the retrieved CGR data objects. For recording and playing back CGR environments over a period of time, CGR data object property values can be stored as key frames (e.g., similar to computer-generated animations) and stored in a storyboard (e.g., timeline). Thus, at playback, the software platform can satisfactorily reproduce a CGR environment simulation over the period of time, for example, by interpolating the key frames.

It should be noted that the playback of a CGR environment includes information about the underlying content, and is not simply a graphical depiction (e.g., image, video) of a CGR environment. This is due in part to the CGR data objects, which include the information needed to simulate the virtual objects of the environment. Thus, because the system has knowledge of the content of the CGR environment, during playback the user can reproduce the saved simulation as it was recorded or modify the content of the CGR environment to provide an alternative CGR simulation.

Furthermore, CGR data objects from different simulations or CGR environments can be co-mingled in a single simulation. For example, one or more stored CGR data objects from a first CGR environment can be stored in memory, retrieved, and be added to a second CGR environment.

Accordingly, users can save CGR simulations (e.g., for local or remote/cloud storage) for subsequent playback, and such simulations can be shared with others. Such saved environments can be experienced as they were recorded and stored, or may be changed (e.g., dynamically changed) during playback.

5. Synchronization of Computer-Generated Reality Environments Among a Plurality of Devices In some embodiments, the CGR system allows for multiple users in different locations to share a CGR environment. For instance, a CGR system can allow simulation (e.g., on two devices of two different users) of two instances of a same CGR environment (e.g., a same virtual room). That is, a CGR environment simulated on a first device is synchronized to a CGR environment simulated on a second device. To allow simulation of the two instances of the CGR environment, the CGR system synchronizes the contents (e.g., virtual contents) in one instance of the CGR environment to the other instance of the CGR environment by transmitting one or more CGR data objects from the first device to the second device. In some embodiments, the first and second devices exchange less than all of a CGR data object (e.g., the portion of a CGR data object that has changed due to simulation). In some embodiments, the CGR data object is transmitted according to the associated security settings. For example, only shareable properties of CGR data objects are synchronized.

Figure 4C:
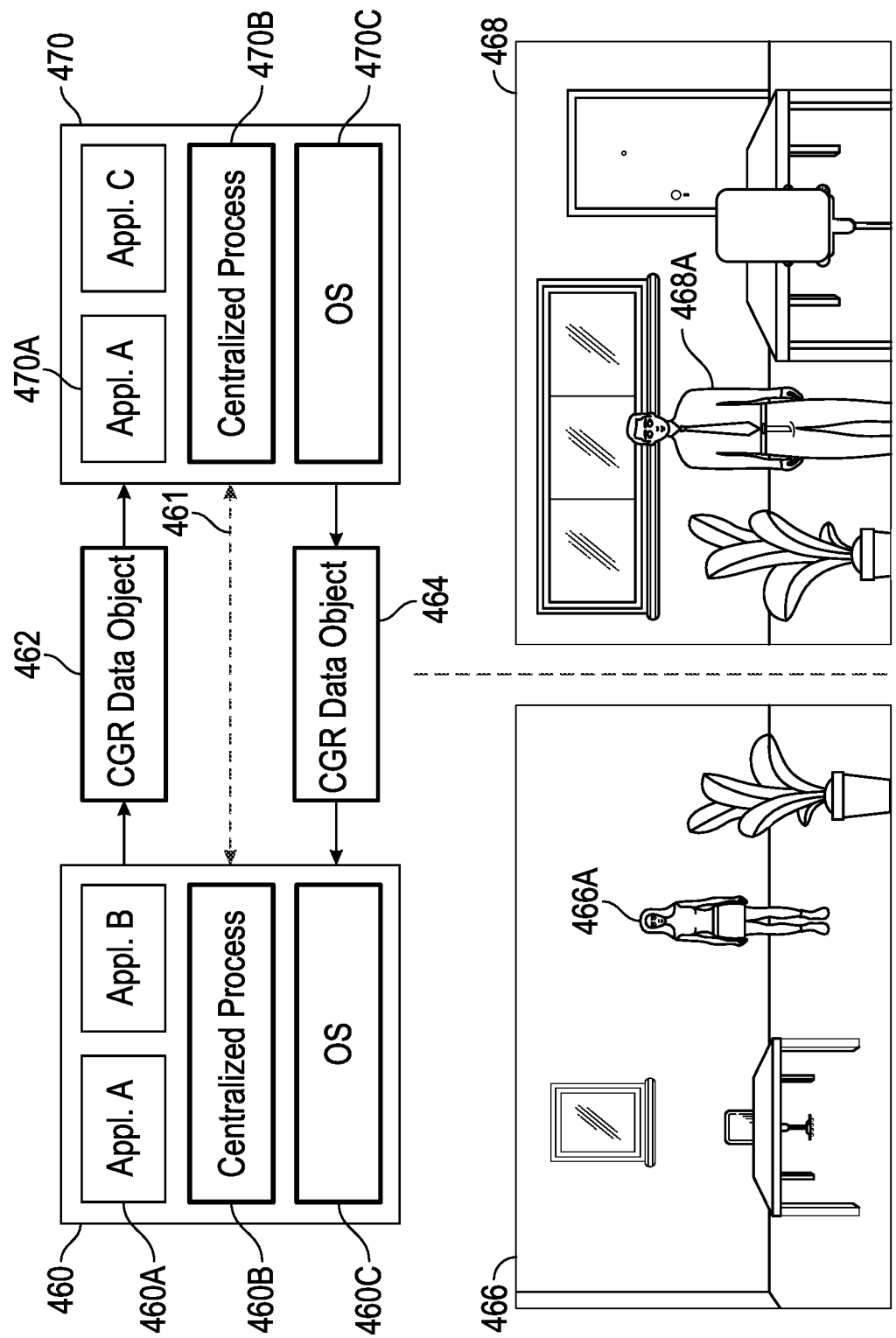

An exemplary application of CGR environment synchronization is used for shared virtual space sessions. FIG. 4C illustrates an exemplary shared virtual space session between two users each using a respective device. In some embodiments, a shared virtual space session includes simulation of a shared CGR environment at two or more different devices (e.g., each being used by a different user). In the shared virtual space session of FIG. 4C, two users using two different devices are placed into a shared CGR environment. First device 460 (e.g., associated with a first user) includes an application 460A executing in communication with a centralized process 460B of an OS 460C. Second device 470 (e.g., associated with a second user) includes an application 470A executing in communication with a centralized process 470B of an OS 470C. Applications 460A and 470A can be different instances of the same application (e.g., a shared virtual space application), executing on different devices. In some embodiments, the shared virtual space session is a process of a centralized process (e.g., 460B, 470B), rather than of an application (e.g., 460A, 470A).

In some embodiments, to establish a shared virtual space session, a first user (e.g., of device 460) can send a request to establish a shared virtual space session, in similar manner as making a phone call, to a second user (e.g., of device 470). If the second user accepts, for example, avatars for the first user (e.g., 468A) and the second user (e.g., 466A) can be placed into a shared virtual space CGR environment. In some embodiments, the respective devices of each user receives and/or provides one or more CGR data objects for the shared virtual space session. For example, in FIG. 4C, devices 460 and 470 are connected via communication link 461 (e.g., connected directly (e.g., via Wi-Fi), over a local area network, over a wide area network, or any suitable manner for exchanging data). Device 460 provides a CGR data object 462 to device 470, and device 470 provides a CGR data object 464 to device 460, over the communication link 461. CGR data objects 462 and/or 464 can represent content to be simulated in the shared virtual space session, such an avatar for a user (e.g., 466A, 468A), a plant, a table, or a chair, among other things in the CGR environment.

In some embodiments, during a shared virtual space session, avatars for the respective other users will be displayed to each user as occupying the shared CGR environment of the shared virtual space session. For example, in FIG. 4C, device 460 displays view 466 of a shared space CGR environment, which includes an avatar 466A representing the second user of device 470. Thus, when the first user views the shared space (e.g., via display of view 466 using device 460), it can appear as if the second user is present in the same room. Likewise, device 470 displays view 468 of the same shared space, which includes an avatar 468A representing the first user of device 460. Thus, when the second user views the shared space (e.g., via display of view 468 using device 470), it can appear as if the first user is present in the same room. In this embodiment, view 466 is the simulated perspective of the avatar 468A (e.g., of the first user, of device 460), and view 468 is the simulated perspective of avatar 466A (e.g., of the second user, of device 470). In some embodiments, the user avatars can interact with each other (e.g., physical or auditory interaction) and/or with other content within the shared virtual space CGR environment (e.g., interact with the table, chair, or plant in the space shown in FIG. 4C). For example, changes to the environment, virtual objects, or avatars (e.g., movement) will be synchronized and reflected in the simulation at both devices, which creates the perception that the users are occupying a shared space.

In some embodiments, while a simulation runs on each of the devices, one simulation can have authority over another. In some embodiments, the device belonging to the user that invited the other user into the CGR environment has authority (e.g., the first user in this example). For example, if the simulation at the first user's device (e.g., 460) has authority, the second user may be restricted in their ability to interact with and/or modify the shared space CGR environment. In some embodiments, a simulation with authority establishes restrictions (e.g., user-defined, or system-defined) on the one or more non-authority simulations. In some embodiments, a simulation with authority controls if there is inconsistency or disagreement between simulations (e.g., if a CGR data object falls out of synchronization).

As should be appreciated based on the description above, the software platform is able to receive and process CGR data objects that were remotely defined (e.g., by another device). The efficient data structure and content of the CGR data objects allow two devices each running the software platform to easily provide a shared experience for two or more users, who are presented with CGR environments that include shared content.

6. Privacy and Security

It should be further appreciated that embodiments as described herein allow the CGR system (e.g., a device running the software platform) to simulate a CGR environment having multiple applications in a privacy preserving manner. Applications are not automatically provided all information needed to simulate and render, such as user input, eye tracking, motion tracking, etc. Thus, information pertaining to the user's activity or their environment (e.g., immediate physical environment, or a private virtual environment) are not unnecessarily provided to applications simply because such applications are installed or running simultaneously. Accordingly, CGR data objects, or their properties, from a first process (e.g., a first application, or an OS-level process) are not necessarily visible to other processes (e.g., a second application)—that is, privacy between processes is maintained.

In some embodiments, an application that defines a virtual object in a CGR simulation is not provided information regarding the virtual object's position (e.g., 3D spatial position) with respect to the CGR environment. That is, a centralized process that controls the simulation knows the position information for every virtual object in the CGR environment, with respect to a "global" or "world" coordinate frame. In some embodiments, this global coordinate frame is not shared with the application. Rather, the application can define the virtual object in terms of an object coordinate system, different than the global coordinate frame. The centralized process can map the object coordinate frame to the global coordinate frame during simulation and rendering in order to properly generate the virtual object. However, because the application itself does not simulate and render interactions with other virtual objects, the position of other virtual objects or the relative position of the virtual object (defined by the application) with respect to other virtual objects or the global coordinate frame does not need to be shared with the application. Conversely, revealing such information to an application could allow the application to determine otherwise private information such as information regarding the user's location (e.g., room dimensions) or other applications that are concurrently running (e.g., based on three-dimensional virtual object dimensions, movement, etc.).

In some embodiments, during a synchronized session, one or more CGR data objects, or properties of CGR data objects, are not to be shared with remote participants. As described above, CGR data objects can be defined in a privacy-preserving manner, for example such that one or more of their properties are prohibited from being shared with any other users, or are shared with only certain other users. For example, a different representation of a virtual object can be shown to shared virtual space users who do not have the necessary permissions.

Additionally, the structure of the exemplary software platform described herein maintains the security of having applications run in an isolated memory space from each other and the OS. Any communication (e.g., to/from cooperative applications) is performed via IPC, which can be managed by the OS.

7. Computer-Generated Reality Application Development

The software platform described herein provides a framework, which can be used with application development tools to easily create immersive and dynamic CGR applications.

This framework allows for simplified development of applications and CGR content. For example, an application can be as simple as defining a 3D object. As such, the developer of such an application need not work to define simulation and rendering routines in order for proper execution of the program. Rather, the program can simply define content in terms of one or more CGR data objects, as described above. During application development, the properties, behaviors, and events defining a CGR data object can be defined by the user, or can be selected from a predefined collection of values, states, or logic (e.g., from a common library). During runtime of a cooperative application, an instance of the CGR engine in the client profile runs as an application-level process of the application, which defines the CGR data object for processing by a centralized process (running in the server profile) controlling the simulation.

The CGR data objects can be used to build simple or complex 3D user interfaces and controls. These user interfaces and controls can have graphics, audio, physics, and behaviors that can be simulated by the CGR engine.

Attention is now turned to embodiments of the software platform that are implemented on one or more electronic devices, such as system 100.

Figure 5:
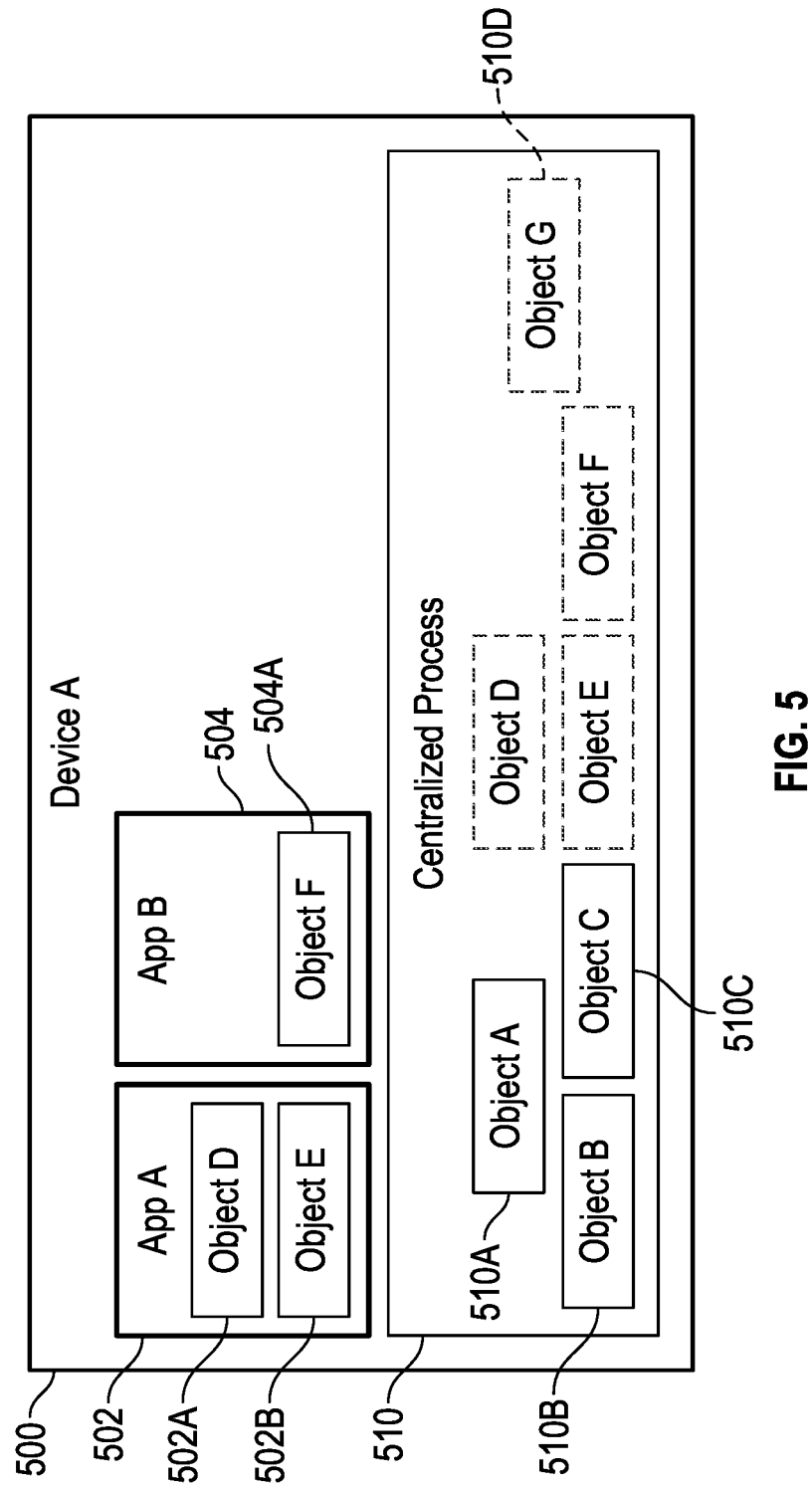
FIG. 5 depicts an exemplary block diagram of processes executing on an electronic device in accordance with some embodiments.

FIG. 5 illustrates an exemplary block diagram of processes executing on an electronic device in accordance with some embodiments of the software platform. Specifically, device 500 (also referred to as Device A) is executing applications 502 (App A) and 504 (App B). In some embodiments, device 500 includes one or more features of system 100. As illustrated in FIG. 5, applications 502 and 504 are executing in conjunction with, and in communication with, a centralized process (e.g., of an operating system) 510. In some embodiments, centralized process 510 includes one or more features of shared process 206. In some embodiments, a device (e.g., device 500) receives a request to launch an application (e.g., application 502 or 504). In response to the request, the device initiates a process of the application. For example, execution of an application (e.g., 502 or 504) can comprise executing one or more processes associated with an application.

As shown in FIG. 5, application 502 generates data objects 502A (Object D) and 502B (Object E), which are depicted within the block representing application 502 with solid borders to indicate that they are generated by application 502. Likewise, application 504 generates data object 504A (Object F), which is depicted within the block representing application 504 with solid borders to indicate that they are generated by application 504. Data objects 502A, 502B, and 504A are provided to the centralized process 510, and are depicted within the block representing centralized process 510 with dotted line borders to indicate that they were generated by a process other than centralized process 510, and provided to centralized process 510. In some embodiments, the centralized process (e.g., 510) is a process of an operating system. In some embodiments, data objects are provided to a centralized process (e.g., 510) using interprocess communication (IPC). For example, the data objects can be communicated by a process of App A to the centralized process 510 (e.g., of the OS) using IPC. In some embodiments, a centralized process (e.g., 510) can include other data objects. For example, as shown in FIG. 5, centralized process 510 includes data objects 510A, 510B, and 510C (each generated by centralized process 510) and data object 510D (generated by another process, not illustrated in FIG. 5). In some embodiments, the data objects (e.g., 502A, 502B, 504A) include one or more features of the CGR data objects as described above. In this embodiment, the data objects 502A, 502B, and 504A represent virtual objects, which the centralized process 510 simulates and renders into a computer-generated reality environment.

FIGS. 6A-6E illustrate an exemplary computer-generated reality environment generated in accordance with some embodiments. The computer-generated reality environment depicted in FIGS. 6A-6E illustrates, for example, the result of simulation and rendering by centralized process 510 of FIG. 5.

Figure 6A:
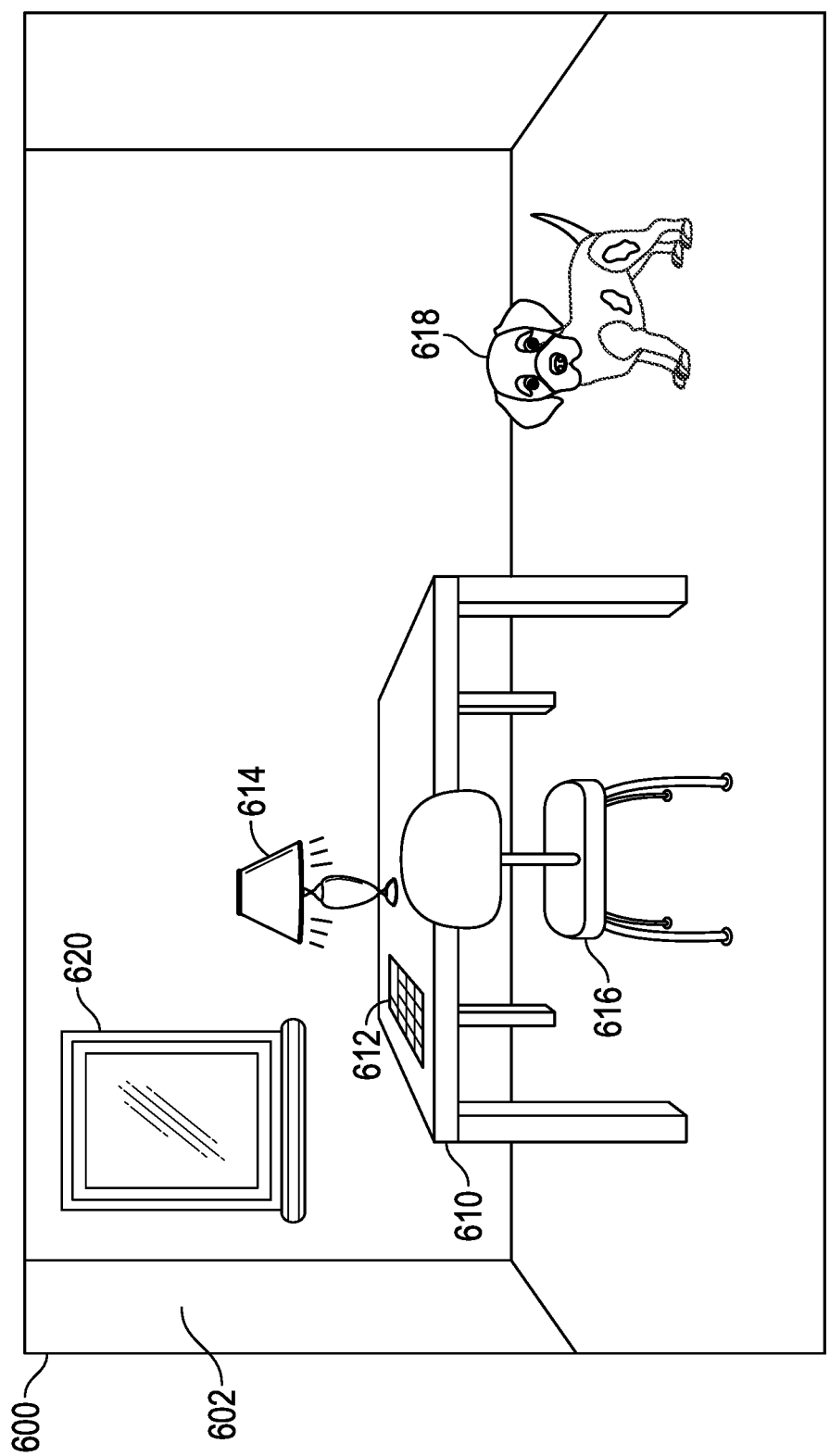
FIGS. 6A-6E depict an exemplary computer-generated reality environment in accordance with some embodiments.

FIG. 6A illustrates a computer-generated reality environment 600 representing a room in the physical world. CGR environment 600 includes virtual room 602, which includes virtual content such as virtual representations of: a table 610, a spreadsheet 612, a lamp 614, a chair 616, a dog 618, and a window 620. As described above, an application can generate one or more CGR data objects that correspond to virtual content in a CGR environment. The virtual content can itself represent the application, where interaction with the virtual content forms the user interface with such application. In the example of FIG. 6A, lamp 614 represents data object 502A of App A (FIG. 5), table 610 represents data object 502B of App A (FIG. 5), and spreadsheet 612 represents data object 504A of App B (FIG. 5). In this embodiment, centralized process 510 of FIG. 5 received data objects 502A and 502B (from a first application 502) and received data object 504A (from a second application 504), and generated the visual representations of those data objects in the CGR environment 600. For example, data object 502A includes information defining one or more properties, one or more behaviors, and one or more events for the lamp 614 shown in FIG. 6A. Property information can include values indicative of the appearance of the lamp, such as: the geometric dimensions of the lamp, a pattern of the lamp's shade, the light generated by the lamp (e.g., intensity, direction, hue, etc.), an on/off state of the lamp, the material of the lamp's base, and the like. Further, property information can include an access level of a portion or all of the data object representing the lamp 614 (e.g., which controls sharing with other devices or users). Event information can include how the lamp 614 reacts to input, such as interaction (e.g., user input) with an on/off switch on the lamp. Behavior information can include an animation or script of behavior exhibited by the lamp. In the case of a lamp, the virtual object may contain simple behavior data (e.g., the lamp is subject to gravity).

In some embodiments, the centralized process (e.g., 510) simulates the computer-generated reality environment. In some embodiments, simulating includes performing one or more computations to create a representation (e.g., of a CGR environment, and/or one or more data objects). In some embodiments, simulating (e.g., of a CGR environment, and/or one or more data objects) includes maintaining the representation in memory. For example, centralized process 510 performs one or more computations to generate (or update) a representation of the CGR environment (e.g., in device memory, such that it can be stored, copied, transmitted, rendered, or the like). In some embodiments, the centralized process renders the computer-generated reality environment. In some embodiments, rendering the computer-generated reality environment includes rendering a (e.g., graphical) representation of one or more data objects received or generated by the centralized process. For instance, in this embodiment, device 500 of FIG. 5 received data objects (e.g., 502A, 502B, and 504A) and generates the rendered CGR environment 600 (e.g., for display) shown in FIG. 6A.

In some embodiments, a first application (e.g., 502) and a second application (e.g., 504) are associated with different service providers. For example, App A can be associated with a first third-party developer, and App B can be associated with a second third-party developer different than the first third-party developer. As shown in FIG. 6A, despite being associated with different third party developers, virtual content from both App A and App B are simulated and rendered into a shared space CGR environment 600 so that the virtual content can be simultaneously displayed in the same simulation.

Figure 6B:
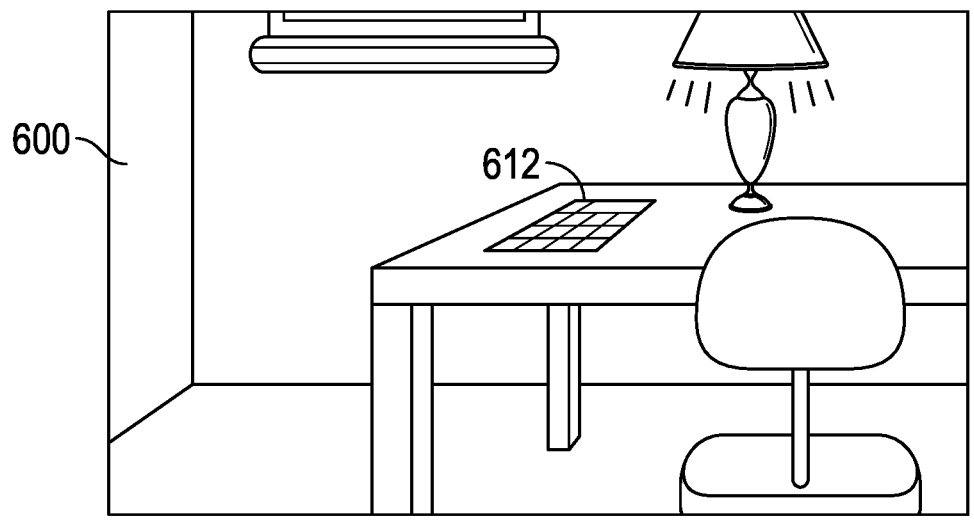
Figure 6C:
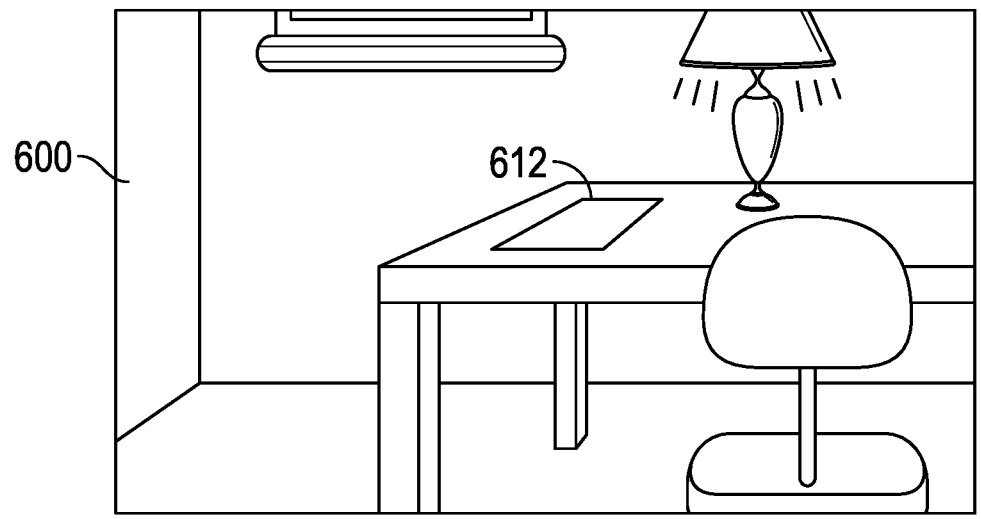

FIGS. 6B-6C illustrate an exemplary use of data object access properties (e.g., sharing restrictions) in accordance with some embodiments. FIG. 6B illustrates a zoomed view of the computer-generated reality environment 600, which shows spreadsheet 612 in larger detail. As shown in the view of FIG. 6B, spreadsheet 612 includes depictions of the data of a spreadsheet. In this embodiment, the representation of spreadsheet 612 in FIG. 6B includes sensitive data that the user of the device would not want to share with other users (e.g., using other devices), for example during a shared virtual space session within CGR environment 600. FIG. 6C illustrates a view of CGR environment 600 that is subject to sharing restrictions. For example, the view in FIG. 6C can be displayed on a second, different device as the view in FIG. 6B, not belonging to the user of device 500. As shown in FIG. 6C, the content of the spreadsheet 612 is not displayed. For example, this can be due to the property information defining the appearance of the spreadsheet 612 not being shared with the process (e.g., executing on a remote device from device 500) that renders the view of CGR environment 600 shown in FIG. 6C. In some embodiments, the property information is shared with particular users. For instance, FIG. 6C can be a view displayed on a device belonging to a user that is not one of the particular users. In some embodiments, the property information is not shared with any other users. For instance, FIG. 6C can be a view displayed on any device belonging to users different than the user of device 500 (e.g., that generated the data object representing spreadsheet 612). In some embodiments, no portion of a data object is shared with another device. For example, rather than providing certain properties that define spreadsheet 612 (e.g., shape, position) to a second device and withholding other properties (e.g., the values in the spreadsheet), the first device (e.g., 500) shares no portion of the data object. For instance, rather than a render a blank spreadsheet 612 (as shown in FIG. 6C), a second device would not display a spreadsheet at all (not illustrated) because no information regarding the respective data object is shared with such device. Thus, two users using two different devices can view the CGR environment with virtual content that is perceptible to both. However, such content need not be identical, allowing the users to maintain privacy of data, for example.

Figure 6D:
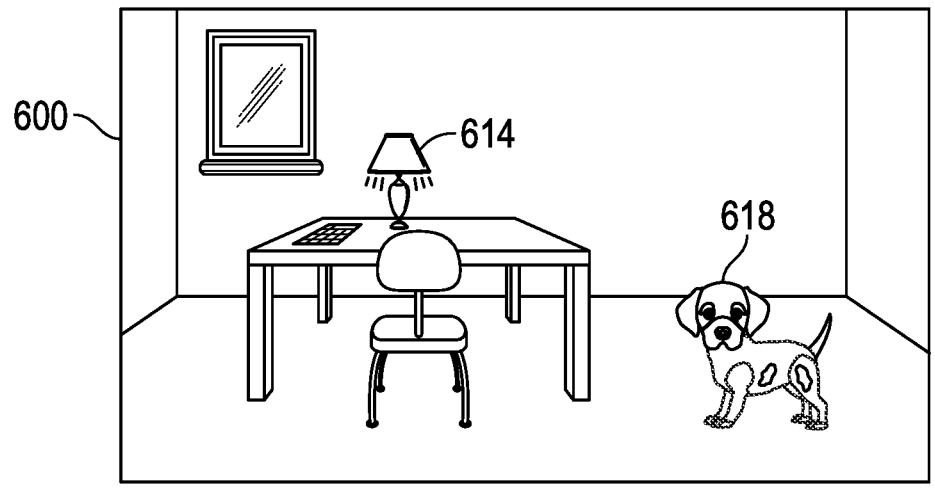
Figure 6E:
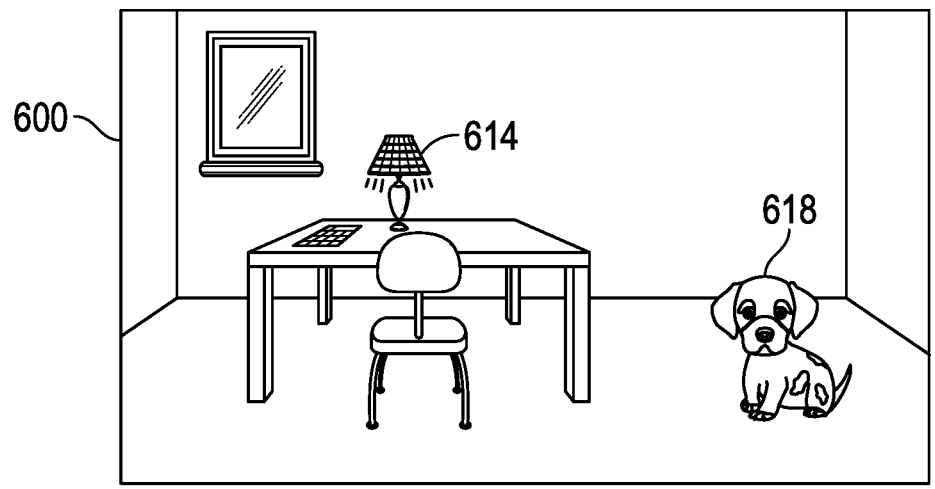

FIGS. 6D-6E illustrate an exemplary change to a computer-generated reality environment. FIG. 6D illustrates CGR environment 600, as shown in FIG. 6A. In some embodiments, a first data object (e.g., 504A, representing spreadsheet 612) provided by a first process (504) is rendered based on a second data object (e.g., 502A, representing lamp 614) provided by a second process. For example, to create a realistic visual rendering, the spreadsheet 612 should appear to be illuminated by light that is emitted from the lamp 614, due to their placement within the CGR environment 600 in FIG. 6D. Accordingly, centralized process 510 renders the data object 504A, representing spreadsheet 612, based on properties of data object 502A, representing lamp 614. For example, if spreadsheet 612 is defined as having a pure white background, but lamp 614 emits light defined has having a slight yellow color, then spreadsheet 612 will be rendered to account for the color of light incident on its surface (e.g., and appear to have a slight yellow hue). Non-limiting examples of effects of a first virtual object that can be taken into account when rendering a second virtual object include: lighting (e.g., direct, indirect), shadows, reflections (e.g., diffuse, specular), collisions, occlusion, or the like.

In some embodiments, a computer-generated reality environment changes after being simulated (e.g., and rendered). FIG. 6E illustrates an exemplary change to the CGR environment 600 of FIG. 6D. As shown in FIG. 6E, the lamp shade of lamp 614 has changed—it now appears having a pattern of lines. In some embodiments, a change to a CGR environment can be due to input (e.g., user input) received at a device (e.g., 500). For example, the user of device 500 could have selected or interacted with the lamp shade or lamp 614, and selected the different patterned shade. For instance, the lamp 614 can be generated by an application for customizing and placing pieces of furniture in a virtual environment. Accordingly, the centralized process updates the simulation and rendering of computer-generated reality environment 600 to reflect the change. Thus, the view of FIG. 6E would be displayed to a user subsequent to the change.

In some embodiments, a change to a CGR environment is due to a behavior or event associated with one or more data objects. For example, FIG. 6E also illustrates that dog 618 has changed position, and is now in a seated pose and facing a different direction. In this embodiment, the dog 618 is associated with a data object that defines behaviors. One such behavior can be that the dog walks around, and changes from standing to sitting (e.g., at random, or at some set of intervals). Likewise, the dog 618 could have changed from a standing to a seated position based on an event—for example, the user of device 500 issued an input command, such as a voice input, instructing the dog to sit. In such an example, the command can be processed by an instance of the CGR engine in centralized process 510 using an AI routine, and the dog 618 would then be simulated to respond accordingly. Accordingly, the centralized process updates the simulation and rendering of computer-generated reality environment 600 to reflect the change to the dog's pose and position, due to the change.

In some embodiments, a computer-generated reality environment (e.g., 600) is three-dimensional (e.g., 3D). In some embodiments, a representation (e.g., lamp 614, table 610, dog 618) of a data object (e.g., 502A, 502B, 504A) is three-dimensional.

Figure 7A:
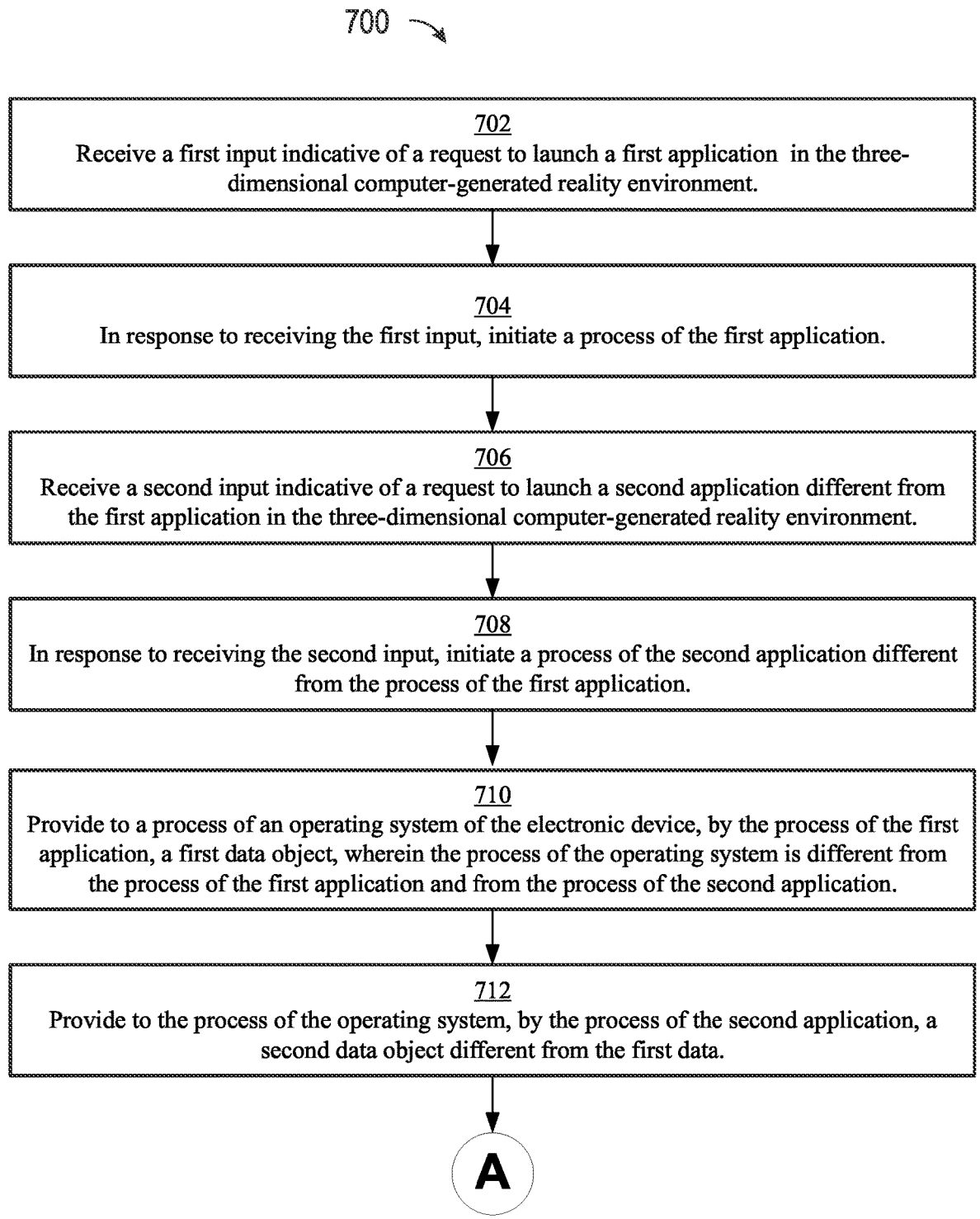
FIGS. 7A-7C depict a flow diagram illustrating a method of generating a computer-generated reality environment in accordance with some embodiments.
Figure 7B:
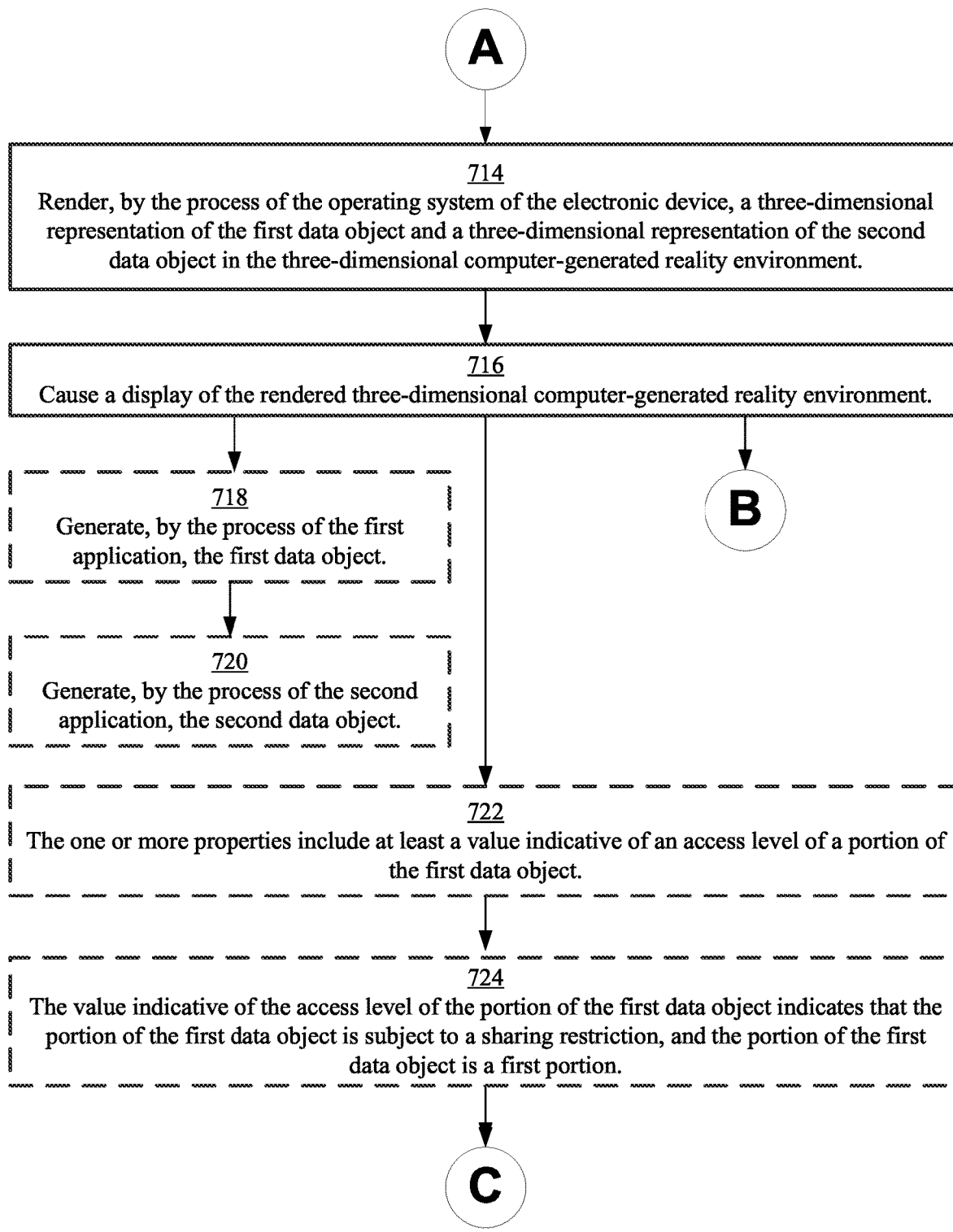
Figure 7C:
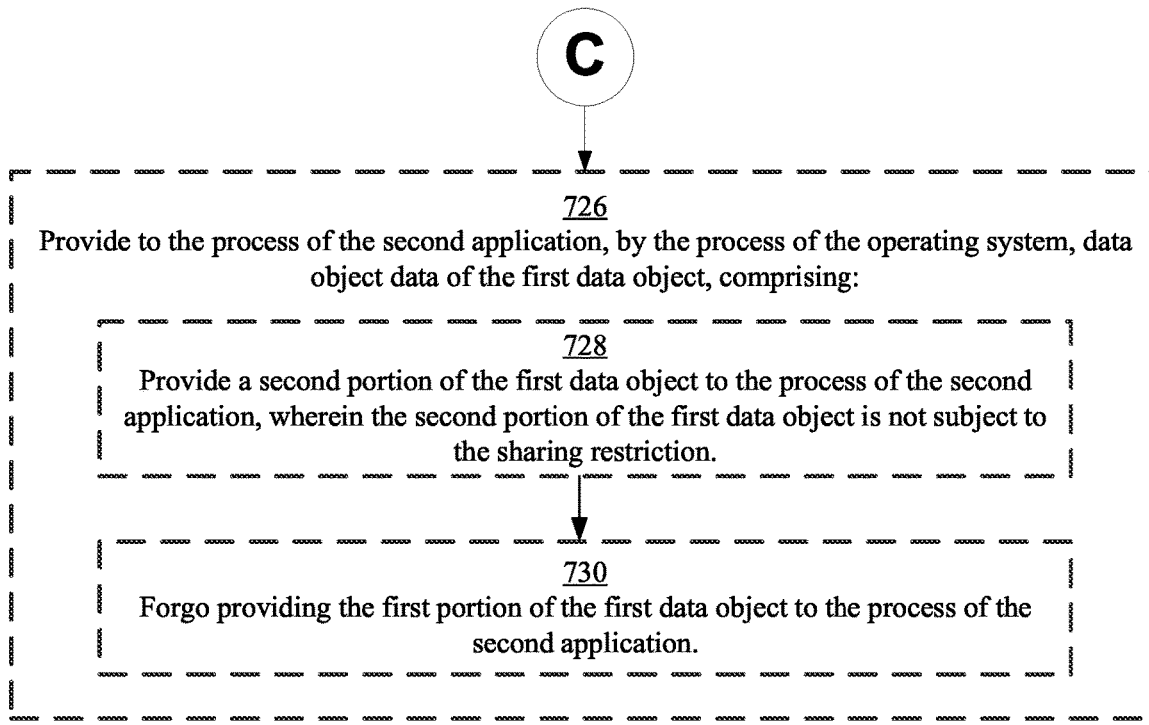
Figure 7C:
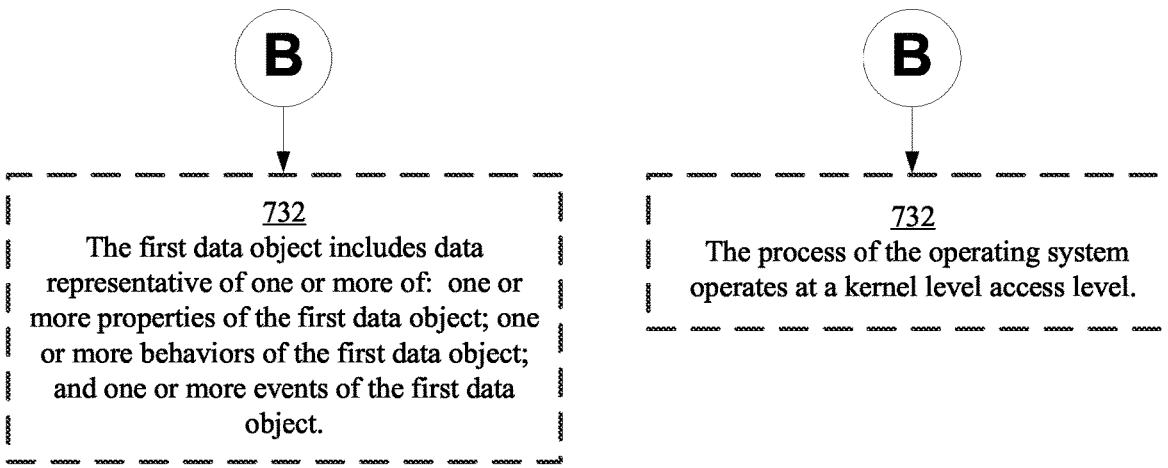

FIGS. 7A-7C are a flow diagram illustrating a method for providing a computer-generated reality platform capable of generating a three-dimensional computer-generated reality environment, in accordance with some embodiments. Method 700 is performed at an electronic device (e.g., 100 or 500).

The electronic device (e.g., 500) receives (702) a first input (e.g., a user input, such as selection of 1010B) indicative of a request to launch a first application (e.g., 504) in the three-dimensional computer-generated reality environment (e.g. 600). For example, the first input can be a voice input (e.g., voice command received at a microphone of device 500, which is processed and determined to be a request to launch an application. In some embodiments, the first input is selection of an affordance. For example, the affordance can be displayed in an application selection interface (e.g., 1010).

In response to receiving the first input, the electronic device initiates (704) a process of the first application (e.g., 504).

The electronic device receives (706) a second input (e.g., a user input, such as selection of 1010A) indicative of a request to launch a second application (e.g., 502) different from the first application (e.g., 504) in the three-dimensional computer-generated reality environment (e.g., 600).

In response to receiving the second input, the electronic device initiates (708) a process of the second application (e.g., 502) different from the process of the first application. For example, both the first application and the second application are cooperative applications. Thus, the applications do not control the simulation and rendering of their visual aspects (e.g., data objects), and can be executed together in a shared space CGR environment. Instead, the applications' contents are simulated and rendered in one shared space and thus can interact with each other (e.g., interaction of visual and/or audio).

The electronic device provides (710) to a process (e.g., 510) of an operating system of the electronic device, by the process of the first application, a first data object (e.g., 504A), wherein the process of the operating system is different from the process of the first application and from the process of the second application. For example, a data object (e.g., a CGR data object) corresponds to a spreadsheet application. CGR data objects (also referred to as "smart objects" or "game objects") represent virtual objects in the computer-generated reality environment (e.g., room, table, user avatar, procedural content). A data object defines the appearance and behavior of an entity (virtual object) in the computer-generated reality environment. Aspects of appearance include but are not limited to: graphical representation, sound, collision model, physical properties (e.g., mass, material). Aspects of behavior includes whether the virtual object is a static object, whether the virtual object is dynamic such that the user can interact with it (e.g., pick it up) or whether the virtual object exhibits AI-driven behavior (e.g., is virtual character that can interact with the user). In some embodiments, the first data object is provided via IPC.

The electronic device provides (712) to the process (e.g., 510) of the operating system, by the process of the second application (e.g., 502), a second data object (e.g., 502A) different from the first data object. In some embodiments, the second data object is provided via interprocess communication.

The electronic device renders (714), by the process (e.g., 510) of the operating system of the electronic device, a three-dimensional representation (e.g., spreadsheet 612 of FIG. 6A) of the first data object (e.g., 504A) and a three-dimensional representation (e.g., lamp 614 of FIG. 6A) of the second data object (e.g., 502A) in the three-dimensional computer-generated reality environment (e.g., 600 of FIG. 6A). In some embodiments, the computer-generated reality environment is rendered from two different perspectives (e.g., one for each eye of a user).

The electronic device causes a display (716) of the rendered three-dimensional computer-generated reality environment (e.g., display of 600 on device 500). In some embodiments, the computer-generated reality environment is displayed from two different perspectives (e.g., one for each eye of a user). For example, the two perspectives are slightly offset, and each are displayed to a respective eye of the user to give the perception of 3D.

In some embodiments, the electronic device generates (718), by the process of the first application, the first data object (e.g., 504A). In some embodiments, the electronic device generates (720), by the process of the second application, the second data object (e.g., 502A). In some embodiments, the process of the first application generates the first data object before providing the first data object to the operating system. In some embodiments, the process of the second application generates the second data object before providing the second data object to the operating system. For example, generating a data object by a process of an application can include procedurally generating the data object by the process.

In some embodiments, the first data object (e.g., 504A) includes (732) data (e.g., data as shown in 301A-301C, or in table 302) representative of one or more of: one or more properties (e.g., 301A) of the first data object, one or more behaviors (e.g., 301B) of the first data object, and one or more events (e.g., 301C) of the first data object. For example, data object 504A (corresponding to spreadsheet 612 of FIG. 6A) can include properties, behaviors, and events associated with simulating and rendering the representation of the spreadsheet virtual object, as shown in CGR environment 600 of FIG. 6A. In some embodiments, the second data object (e.g., 502A) includes data representative of one or more of: one or more of properties of the second data object, one or more behaviors of the second data object, and one or more events of the second data object. For example, data object 502A (corresponding to lamp 614 of FIG. 6A) can include properties, behaviors, and events associated with simulating and rendering the representation of the lamp virtual object, as shown in CGR environment 600 of FIG. 6A.

In some embodiments, the one or more properties (e.g., 301A) include a value (e.g., such as those listed under "graphics" in table 302) indicative of an appearance of the rendered three-dimensional representation (e.g., spreadsheet 612 of FIG. 6A) of the first data object (e.g., 504A), wherein the three-dimensional representation of the first data object is rendered based on the value indicative of the appearance (e.g., rendered as shown in the view of CGR environment 600 of FIG. 6A). Properties define appearance and store state of the entity. In some embodiments, these properties include: name, position, orientation (e.g., coordinates with respect to a global coordinate system (e.g., maintained by the OS) or an object coordinate system (e.g., maintained by the application)), 3D model, collision shape, sounds, texture, shape, mass, animation, friction, material, and other data usable to simulate of the virtual object.

In some embodiments, the one or more properties include (722) at least a value indicative of an access level of a portion (e.g., all of, a first portion but not a second portion, etc.) of the first data object (e.g., 504A). For example, an access level can include a setting or property that controls whether any portion of the data object (up to and including the entirety of the object) is accessible to (e.g., shared with) another user, device, or application. Thus, the data object can have built-in security and privacy properties. For instance, a data object can include metadata defining whether a property can be synchronized to another device and/or known to the other applications. Some data objects are completely shareable, some only have certain properties that are shareable, and some are not shareable.

In some embodiments, the value indicative of the access level of the portion of the first data object indicates (724) that the portion of the first data object is subject to a sharing restriction (e.g., portion of the data object represents properties that are not to be shared), and the portion of the first data object is a first portion. For example, the first portion can include the surface texture information within the data object (e.g., 504A) representing spreadsheet 612 of FIG. 6B. The electronic device provides (726) to the process of the second application, by the process of the operating system, data object data of the first data object, comprising: providing (728) a second portion of the first data object to the process of the second application, wherein the second portion of the first data object is not subject to the sharing restriction; and forgoing providing (730) the first portion of the first data object to the process of the second application. For example, as shown in FIG. 6C, the surface texture information (e.g., the first portion) for the spreadsheet 612 has not been shared with the process (e.g., a remote process on a second device) that rendered the visual representation of spreadsheet 612, and thus the data within the spreadsheet depicted is not visible. However, the 3D model (e.g., the second portion of the data object) for the spreadsheet 612 was shared, and thus a blank spreadsheet 612 is still rendered such that the presence of a virtual object is still perceptible in FIG. 6C.

In some embodiments, the process (e.g., 510) of the operating system operates (732) at a kernel level access level. In some embodiments, the process of the first application and the process of the second application operate at a lower access level than a kernel level access level. In some embodiments, a kernel level is the highest privilege level/ring (e.g., ring 0), and the applications operate at a lower privilege level (e.g., such as rings 1, 2, 3, etc.). In some embodiments, privilege levels define a respective level of permission to access device resources.

In some embodiments, the one or more behaviors (e.g., 301B) are indicative of one or more actions (e.g., "obstacle avoidance" in table 302 of FIG. 3) by the three-dimensional representation of the first data object in the computer-generated reality environment. For example, behaviors define application logic, and can be user-defined behavior or predefined behaviors that are available in a common library or development tool. Examples of behaviors include defining a virtual object that can react to gravity, can be pushed, can collide, can perform complex AI behaviors such as moving on its own like a dog/person, and the like.

In some embodiments, the one or more events are indicative of one or more actions by the three-dimensional representation of the first data object performed in response to a state change in the computer-generated reality environment. For example, events define state changes that can trigger other actions. For instance, a data object may have a "touch event" (e.g., when the corresponding virtual object is touched by another virtual object (e.g., a representation of the user's hand) in a computer-generated reality environment), or a data object representing a virtual button or switch can have "click event" (e.g., when the button is pressed in the CGR environment). In some embodiments, the action performed in response to the state change can be one or more behaviors, as described above. For example, in response to the event of a touch on a switch of lamp 614 of FIG. 6A, the representation of the lamp can turn off (e.g., cease to emit illumination).

In some embodiments, the three-dimensional representation (e.g., spreadsheet 612) of the first data object (e.g., 504A) is rendered based on the first data object and the second data object (e.g., 502A). For example, as shown in view 1004 of FIG. 10A, the illumination of lamp 614 (e.g., represented by a data object, such as 502A) affects the rendered appearance of spreadsheet 612 (e.g., represented by a data object, such as 504A). Thus, the data object of the second application affects the simulation of the first application.

In some embodiments, the operating system (e.g., 420, executing process 510) and the first application (e.g., 504) are associated with different service providers. For example, the first application is a third-party application, made by a different creator, developer, publisher, or the like, than the operating system that is executing the shared process performing the simulation and rendering. In some embodiments, the operating system is associated with a first service provider and not with a second service provider and the first application is associated with the second service provide and not with the first service provider.

In some embodiments, the first application (e.g., 504) and the second application (e.g., 502) are associated with different service providers. For example, the first application and the second application are made by different creators/developers/publishers than each other (e.g., are both third-party applications made by different third parties). In some embodiments, the first application is associated with a third service provider and not with a fourth service provider and the second application is associated with the fourth service provide and not with the third service provider.

In some embodiments, the electronic device is a headset base station. For example, the electronic device performs simulation and rendering of a CGR environment, which is communicated to a headset device (e.g., for display to a user) via a connection. In some embodiments, the electronic device is a headset. For example, the electronic device includes a display device and performs the simulation, rendering, and display of a CGR environment.

Figure 8:
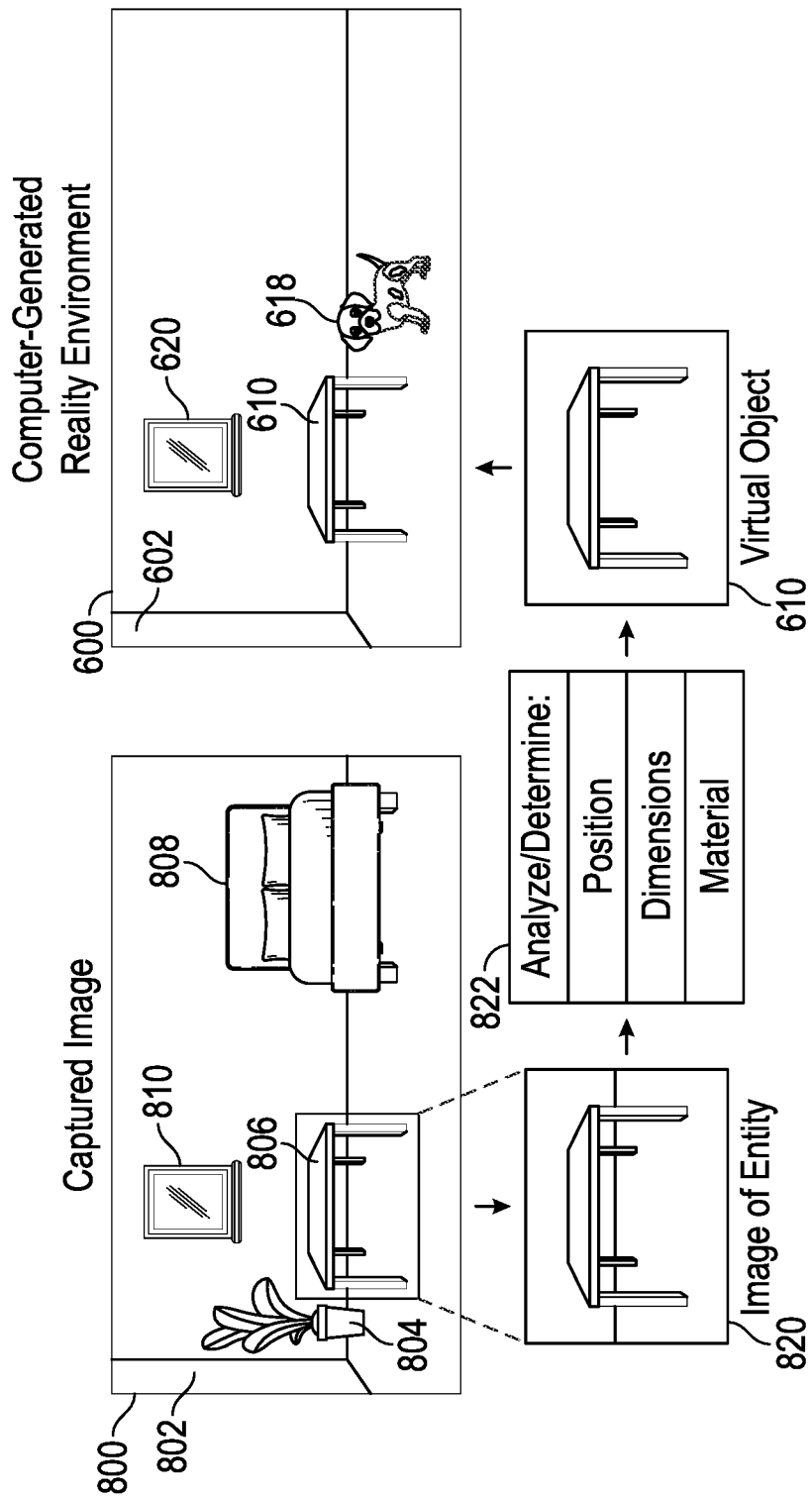
FIG. 8 depicts creation of an exemplary virtual object in a computer-generated reality environment in accordance with some embodiments.

FIG. 8 illustrates an exemplary computer-generated reality environment generated in accordance with some embodiments. Captured image 800 illustrates an image captured of a physical environment (e.g., a user's bedroom). Image 800 includes depictions of the following physical entities: room 802 (e.g., a wall defining the room), plant 804, table 806, bed 808, and window 810. The physical entities 802-810 are each present in the physical room, which is represented by captured image 800.

As discussed above with respect to FIGS. 6A-6E, centralized process 510 can obtain a data object from an application, for instance, via interprocess communication. In accordance with some embodiments, a process (e.g., centralized process 510) generates a CGR environment using at least one data object that is obtained from a source other than an application (e.g., a cooperative application, such as 502 or 504). For example, a shared process of the operating system, such as centralized process 510 or a sub-process thereof, can generate a data object representing a virtual entity in a CGR environment.

As shown, FIG. 8 depicts a view of CGR environment 600 that only includes virtual room 602, table 610, dog 618, and window 620. In this example, dog 618 is represented by a data object received from (and generated by) an application (e.g., data object 510D of FIG. 5) at the centralized process. As can be seen in captured image 800, there is no physical entity in the physical room corresponding to the dog 618. Thus, the dog 618 represents a purely virtual entity. Further, in this example table 610 and window 620 are representative of physical entities depicted in captured image 800. Table 610 corresponds to physical entity table 806, and window 620 corresponds to physical entity window 810. In some embodiments, a virtual object (e.g., 620, 610) is obtained by a shared process (e.g., centralized process 510). In some embodiments, the shared process (e.g., 510) obtains information regarding the physical entity. For example, because an application does not provide a data object that will create the representation of table 610 shown in FIG. 8, centralized process 510 obtains (e.g., generates, retrieves, compiles, or creates) such a data object or portion thereof, or information for creating such data object.

In some embodiments, a shared process (e.g., 510) obtains at least a portion of the information regarding the physical entity based on one or more machine-learning models (e.g., a computer vision model). In some embodiments, the shared process (e.g., 510) uses image analysis to obtain information regarding a physical entity. For example, centralized process 510 can use image analysis on the image portion 820 (of image 800) that includes the depiction of table 806, in order to determine one or more features that can be represented as a data object that can be simulated (e.g., and rendered). In some embodiments, the device (e.g., device 500, executing centralized process 510) uses an image sensor to obtain an image of the physical entity. For example, the image sensor can be a component of the device (e.g., 500), or in communication with the device. FIG. 8 illustrates several exemplary properties 822 that can be determined using image analysis, including: a position of the table (e.g., relative to other physical objects, in the room, etc.), dimensions of the table (e.g., length, width, height of the table's parts), and a material of the table (e.g., wood, metal, plastic, etc.). This list is not intended to be exhaustive of properties that can be determined using image analysis. In some embodiments, the process determines a type of physical object using one or more captured images, and obtains a data object (or portion thereof) based on the type of physical object. For example, image analysis of image portion 820 can be used to determine that the physical entity is a table. With knowledge that the physical entity depicted is a table, the process assigns one or more properties, behaviors, and/or events to the respective data object that are (generally) properties of tables. For example, though the captured image does not depict the table with an object resting upon it, the system can create a virtual object that has a rigid surface top.

In some embodiments, the shared process (e.g., 510) creates the data object representing the physical entity. For example, centralized process 510 can use information obtained or generated by the system to create the data object (e.g., 510A) representative of table 610 shown in FIG. 8.

Figure 9A:
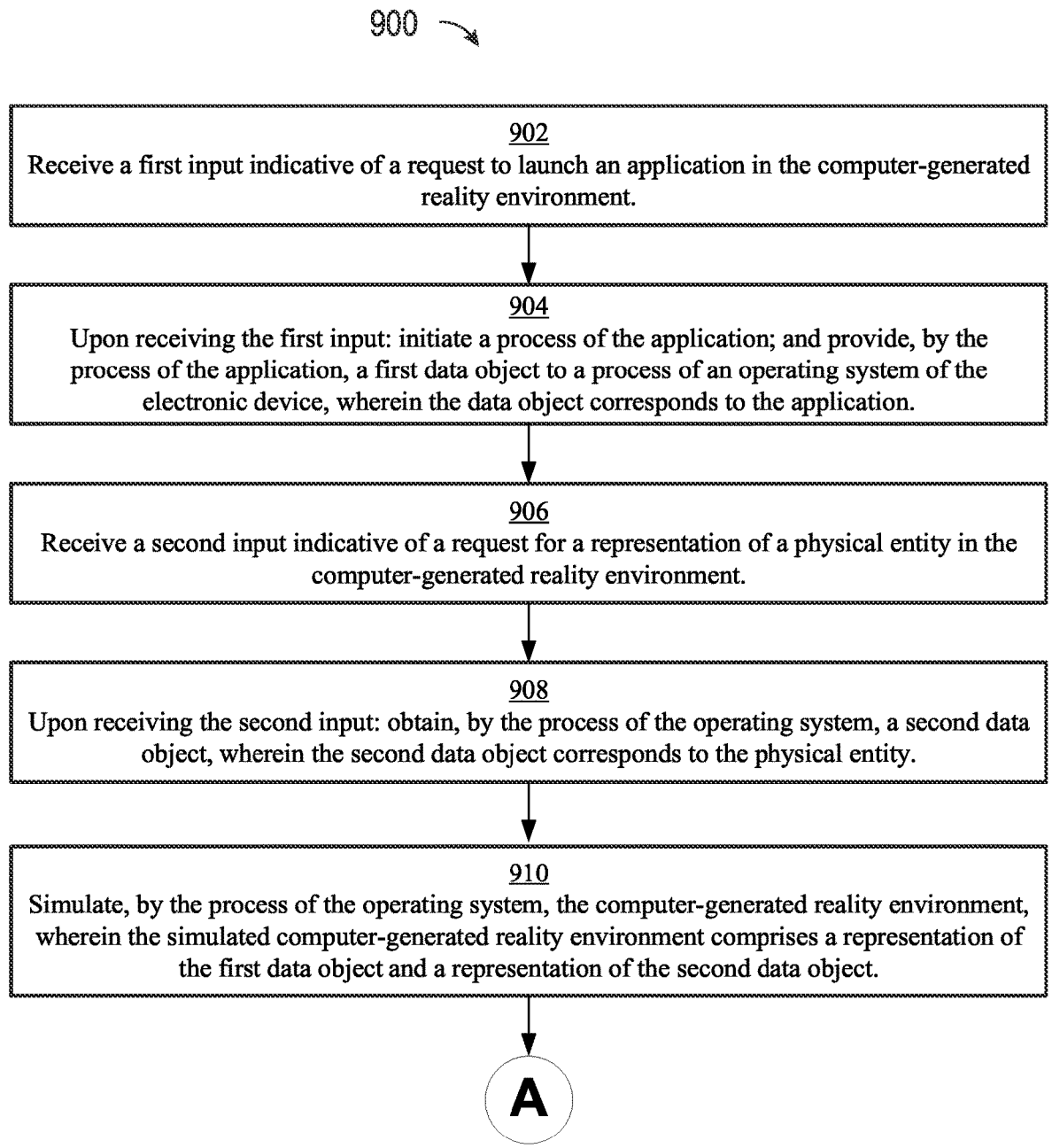
FIGS. 9A-9C depict a flow diagram illustrating a method of generating a computer-generated reality environment in accordance with some embodiments.
Figure 9B:
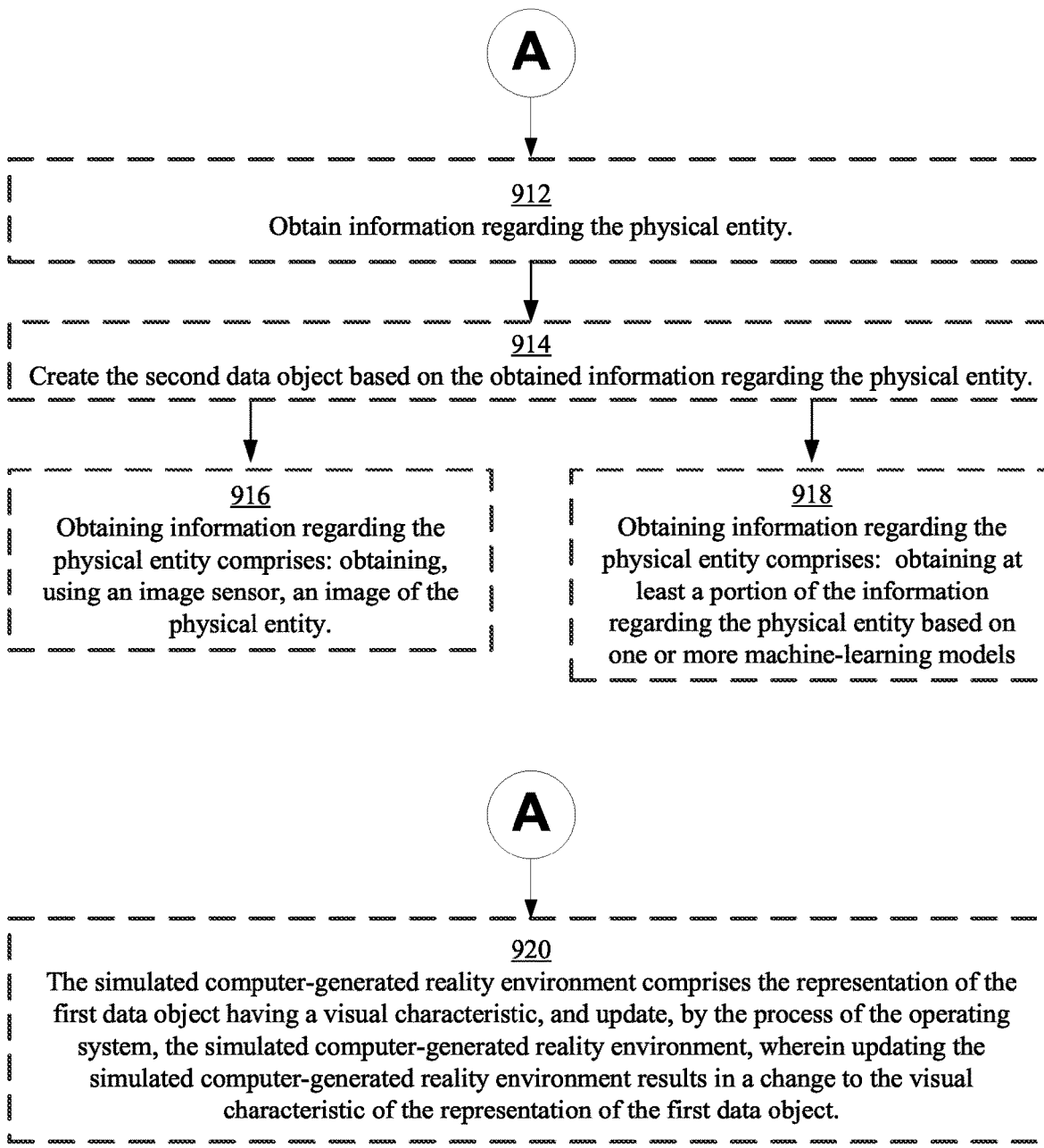
Figure 9C:
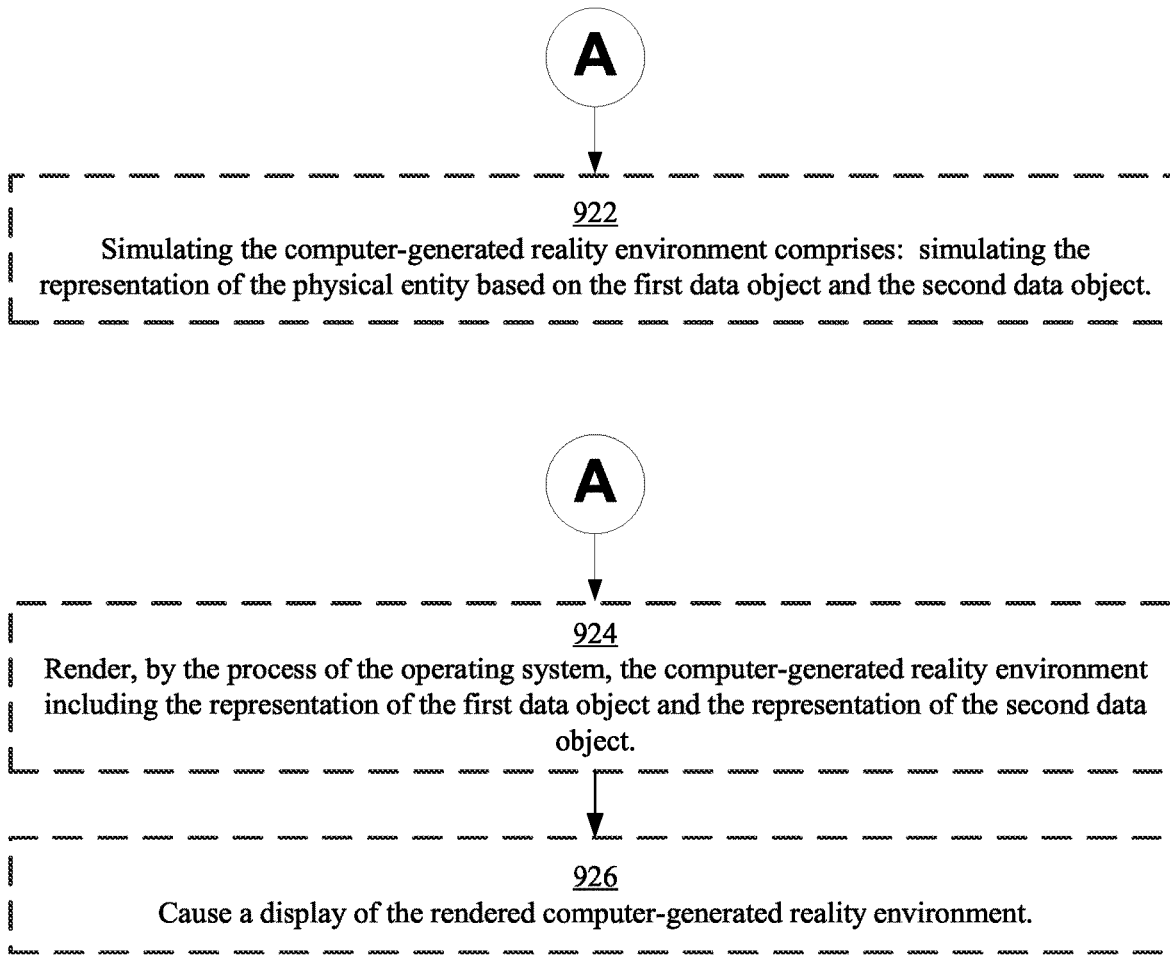

FIGS. 9A-9C are a flow diagram illustrating a method for providing a computer-generated reality platform capable of generating a computer-generated reality environment, in accordance with some embodiments. Method 900 is performed at an electronic device (e.g., 100 or 500).

The electronic device (e.g., 500) receives (902) a first input (e.g., selection of an affordance such as 1010C of FIG. 10B) indicative of a request to launch an application (e.g., 502) in the computer-generated reality environment (e.g., 600 of FIG. 8). For example, the device receives input selection of affordance 1010C, representing a dog application (e.g., the user wants to launch a virtual dog application in the CGR environment).

Upon receiving the first input (904), the electronic device initiates a process of the application (e.g., 502) and provides, by the process of the application, a first data object (e.g., 502A) to a process of an operating system (e.g., 510) of the electronic device, wherein the data object corresponds to the application. For example, in response to receiving a request to launch a virtual dog application, a process of the virtual dog application is initiated. The virtual dog application process provides, to a centralized process (e.g., 510), a data object representing the virtual dog.

The electronic device receives (906) a second input indicative of a request for a representation of a physical entity (e.g., represented by 806) in the computer-generated reality environment. For example, the second input can be a request to display a CGR environment (e.g., launch of centralized process 510), which includes procedurally-generated content (e.g., virtual content representing content from the physical environment). For instance, the user wants to have a real desk from the physical world simulated in the CGR environment.

Upon receiving the second input, the electronic device obtains (908), by the process of the operating system, a second data object (e.g., 510A), wherein the second data object corresponds to the physical entity. For example, a centralized process (e.g., 510) obtains a second data object without initiating a separate process.

The electronic device simulates (910), by the process (e.g., 510) of the operating system, the computer-generated reality environment (e.g., 600 of FIG. 8), wherein the simulated computer-generated reality environment comprises a representation (e.g., 618) of the first data object (e.g., 502A) and a representation (e.g., 610 of FIG. 8) of the second data object (e.g., 510A). For example, the CGR system simulates the virtual dog 618 shown in FIG. 8 (from a data object provided by an application) and simulates the table 610 (from a data object obtained by a centralized process). In some embodiments, the table 610 can be a piece of furniture that is procedurally-generated by a centralized process in charge of simulation and rendering (e.g., for one or more cooperative applications), rather than receiving a respective data object from a cooperative application. In some embodiments, the representation is two-dimensional. In some embodiments, the representation is three-dimensional.

In some embodiments, simulating includes performing one or more computations to create a representation (e.g., of a CGR environment, and/or one or more data objects). In some embodiments, simulating (e.g., of a CGR environment, and/or one or more data objects) includes maintaining the representation in memory.

In some embodiments, the electronic device obtains (912) information (e.g., image 820) regarding the physical entity (e.g., 806). For example, the electronic device obtains (e.g., retrieves, determines, creates, or the like) information that describes the physical entity. For example, such information can be preexisting for this particular physical entity (e.g., the physical entity has been previously simulated), or data for a similar physical entity (e.g., the physical entity is of a class, such as a table, and properties for such class are obtained).

In some embodiments, the electronic device creates (914) the second data object based on the obtained information regarding the physical entity (e.g., 806). For example, the second data object is created and includes properties, behaviors, and/or events representative of table 806.

In some embodiments, obtaining information regarding the physical entity comprises: obtaining (916), using an image sensor, an image of the physical entity. For example, if a physical entity is in physical proximity to the electronic device, such as in the same room, an image of the physical entity is captured by the device. In some embodiments, the image sensor is a component of the electronic device (e.g., on a smartphone). In some embodiments, the image sensor is connected to the electronic device (e.g., the device is a base station and the camera is on the headset connected thereto). In some embodiments, the physical entity is a piece of furniture. In some embodiments, the physical entity is a person.

In some embodiments, the information regarding the physical entity includes visual characteristics of the physical entity. For example, the information can include information related to the color, shape, dimensions, material, or the like.

In some embodiments, the information regarding the physical entity includes physical characteristics of the physical entity. For example, the information can include information related to the friction, elasticity, material type, or the like. In some embodiments, information regarding the physical entity are inferred by the system. For example, the CGR system can infer the surface friction of a virtual object that is determined to wood (e.g., and set to a predefined default value that is typical of a wood surface).

In some embodiments, obtaining information regarding the physical entity comprises: obtaining (918) at least a portion of the information regarding the physical entity based on one or more machine-learning models. For example, physical characteristics can be derived based on similarities of the physical entity to other entities having known characteristics based on an analysis of the captured image of the physical entity.

In some embodiments, the simulated computer-generated reality environment (e.g., 600 of FIG. 8) comprises the representation (e.g., 618) of the first data object having a visual characteristic (e.g., pose of dog 618), and the electronic device updates (920), by the process of the operating system, the simulated computer-generated reality environment, wherein updating the simulated computer-generated reality environment results in a change to the visual characteristic of the representation of the first data object. For example, in the computer-generated reality environment (e.g., 600) of FIG. 8, the dog 618 is in a first pose (standing) and updating the simulation can result in a change to the pose, such that the dog is depicted in a second pose (seated) (e.g., as shown in CGR environment 600 of FIG. 6E). Thus, the virtual dog's appearance changes as a result of updating the CGR environment.

In some embodiments, simulating the computer-generated reality environment comprises: simulating (922) the representation (e.g., 610 of FIG. 8) of the physical entity (e.g., represented by 806) based on the first data object and the second data object. For example, the first data object (e.g., corresponding to lamp 614) illuminates the second object (e.g., corresponding to table 610), thereby affecting the visual appearance of the table.

In some embodiments, the electronic device is a headset base station.

In some embodiments, the computer-generated reality environment is a three-dimensional computer-generated reality environment. In some embodiments, the computer-generated reality environment is rendered from two different perspectives (e.g., one for each eye of a user).

In some embodiments, the representation (e.g., 618 of FIG. 8) of the first data object is three-dimensional, and the representation (e.g., 610 of FIG. 8) of the second data object is three-dimensional.

In some embodiments, the operating system and the application are associated with different service providers. For example, the application is a third-party application. In some embodiments, the operating system is associated with a first service provider and not with a second service provider and the first application is associated with the second service provide and not with the first service provider.

In some embodiments, the electronic device renders (924), by the process of the operating system, the computer-generated reality environment (e.g., 600 of FIG. 8) including the representation (e.g., 618) of the first data object and the representation (e.g., 610) of the second data object. In some embodiments, the electronic device causes a display of the rendered computer-generated reality environment. For example, the CGR system displays the view of environment 600 shown in FIG. 8.

In some embodiments, the process (e.g., 510) of the operating system operates at a kernel level access level. In some embodiments, the process (e.g., 510) of the application operates at a lower access level than a kernel level access level.

Figure 10A:
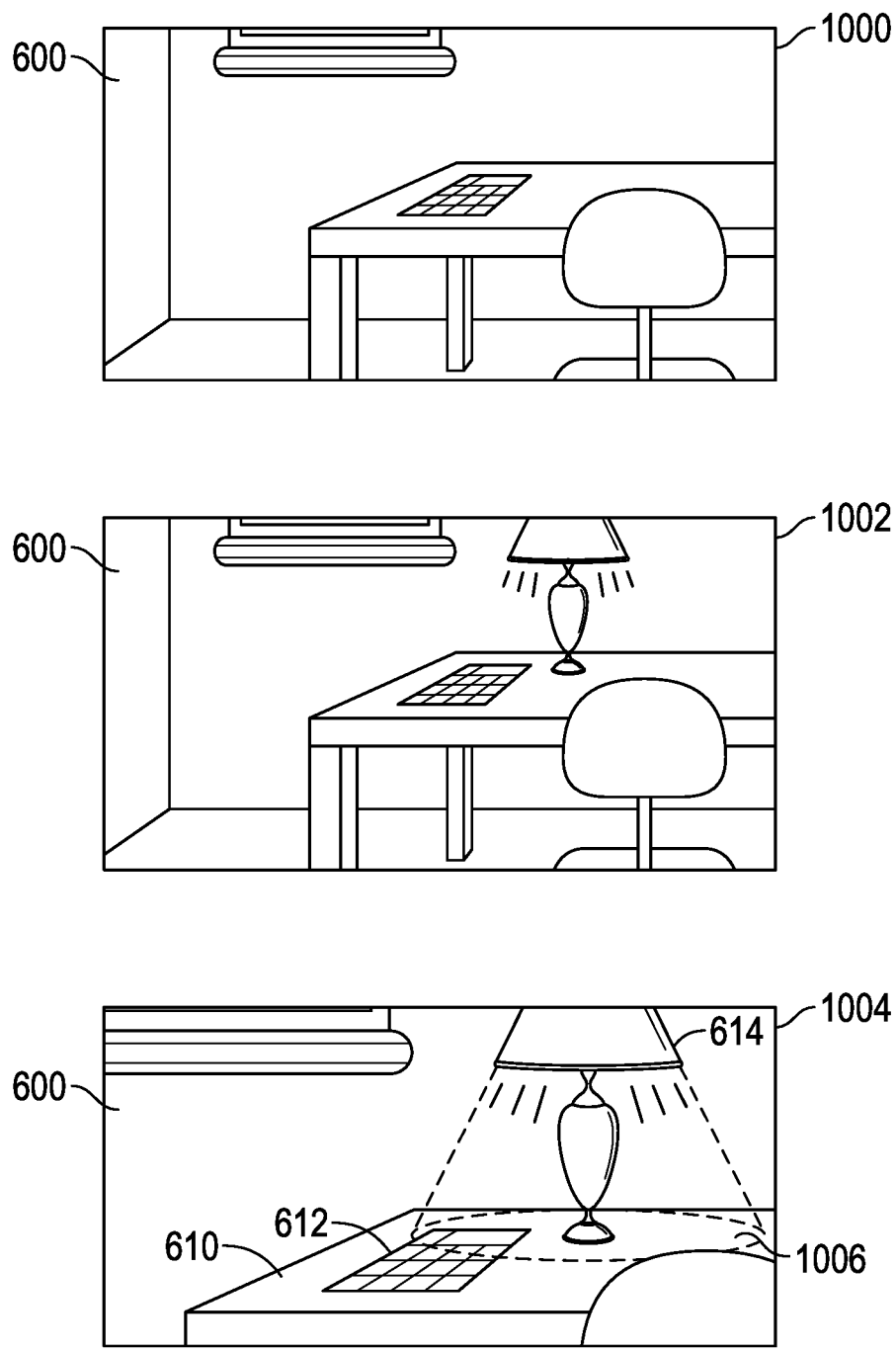
FIGS. 10A-10B depict the addition of a virtual object to a computer-generated reality environment in accordance with some embodiments.
Figure 10B:
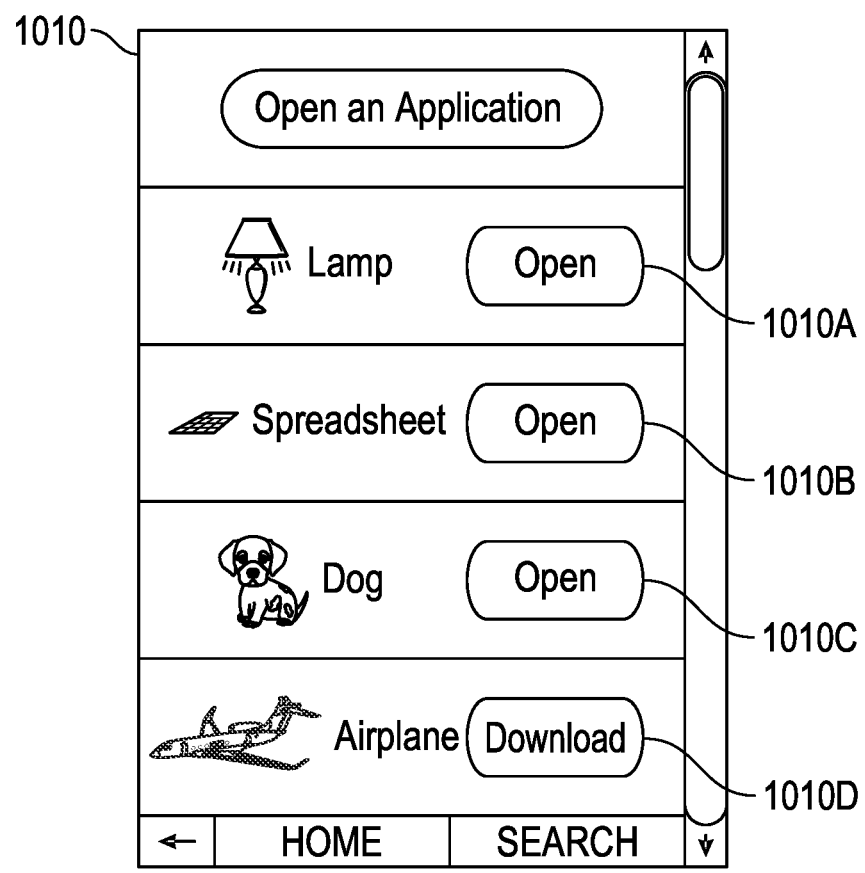

FIGS. 10A-10B illustrate an exemplary technique for launching a computer-generated reality application in accordance with some embodiments. In some embodiments, a device (e.g., 500) receives a request (e.g., via input, such as selection of affordance 1010A) to launch an application (e.g., a cooperative application, such as 502) into an existing computer-generated reality environment simulation. For example, view 1000 of FIG. 10A illustrates a computer-generated reality environment (e.g., 600) before a device launches a lamp application (e.g., 502). As shown, the lamp 614 is not present on the table. While view 1000 is the current view of CGR environment 600, a device receives a request (e.g., via input, such as selection of affordance 1010A) to launch the application represented by the lamp 614. Accordingly, centralized process 510 receives a data object 502A representing lamp 614, and simulates and renders lamp 614 into the CGR environment 600. View 1002 of FIG. 10A shows the current view after launching the lamp application—as shown, CGR environment now includes lamp 614. Thus, a request to launch an application can be received while a CGR environment is already being simulated (e.g., and rendered). In response, one or more new data objects can be added to the simulation, and the simulation updated accordingly. Accordingly, a user of a CGR system in accordance with the embodiments described herein can dynamically add (e.g., or remove) cooperative applications and their respective data objects into active CGR environment simulations. Due to the centralized processing of the data objects, the simulation can be updated and rendered according to whatever combination of data objects and applications are chosen by the user, even if such applications are from different third-party creators. One of skill in the art would appreciate the customization and scalability provided by the techniques described herein.

To further illustrate the dynamic nature of CGR environment simulation, view 1004 of CGR environment 600 depicts an example of data objects from two different cooperative applications interacting in a shared simulation space. View 1004 is a detailed, zoomed view of view 1002. In view 1004, lamp 614 is on, and creates the light pattern 1006, which covers a portion of spreadsheet 612 and a portion of the table. Because lamp 614 was added in response to a request to launch an application while the CGR environment 600, and spreadsheet 612, was already being simulated and rendered, the simulation (e.g., including virtual objects therein) can be updated to take into account the effect of the added lamp's 614 light pattern 1006.

In some embodiments, the request to launch an application is an input indicative of a selection of an affordance. In some embodiments, a CGR system receives a request to launch an application at an application selection interface. For example, FIG. 10B illustrates an exemplary application selection interface 1010. In this example, device 500 receives input (e.g., user input) selection of a lamp application via selection of affordance 1010A at application selection interface 1010, which device 500 displays. In some embodiments, an application selection interface is displayed in the CGR environments. For example, interface 1010 can itself be rendered as a virtual object into the CGR environment 600. Thus, a user can interact with the interface 1010 (e.g., by selecting affordance 1010A) using interactions in the 3D environment of CGR environment 600. In response to receiving the selection of affordance 1010A, the CGR system can launch the lamp application (e.g., as shown in FIG. 10A). Application selection interface 1010 also includes affordance 1010B for launching a spreadsheet application (e.g., represented by spreadsheet 612 of FIG. 10A). Application selection interface 1010 also includes affordance 1010D for downloading (e.g., and launching) an airplane application (e.g., represented by data object 301 of FIG. 3).

Figure 11A:
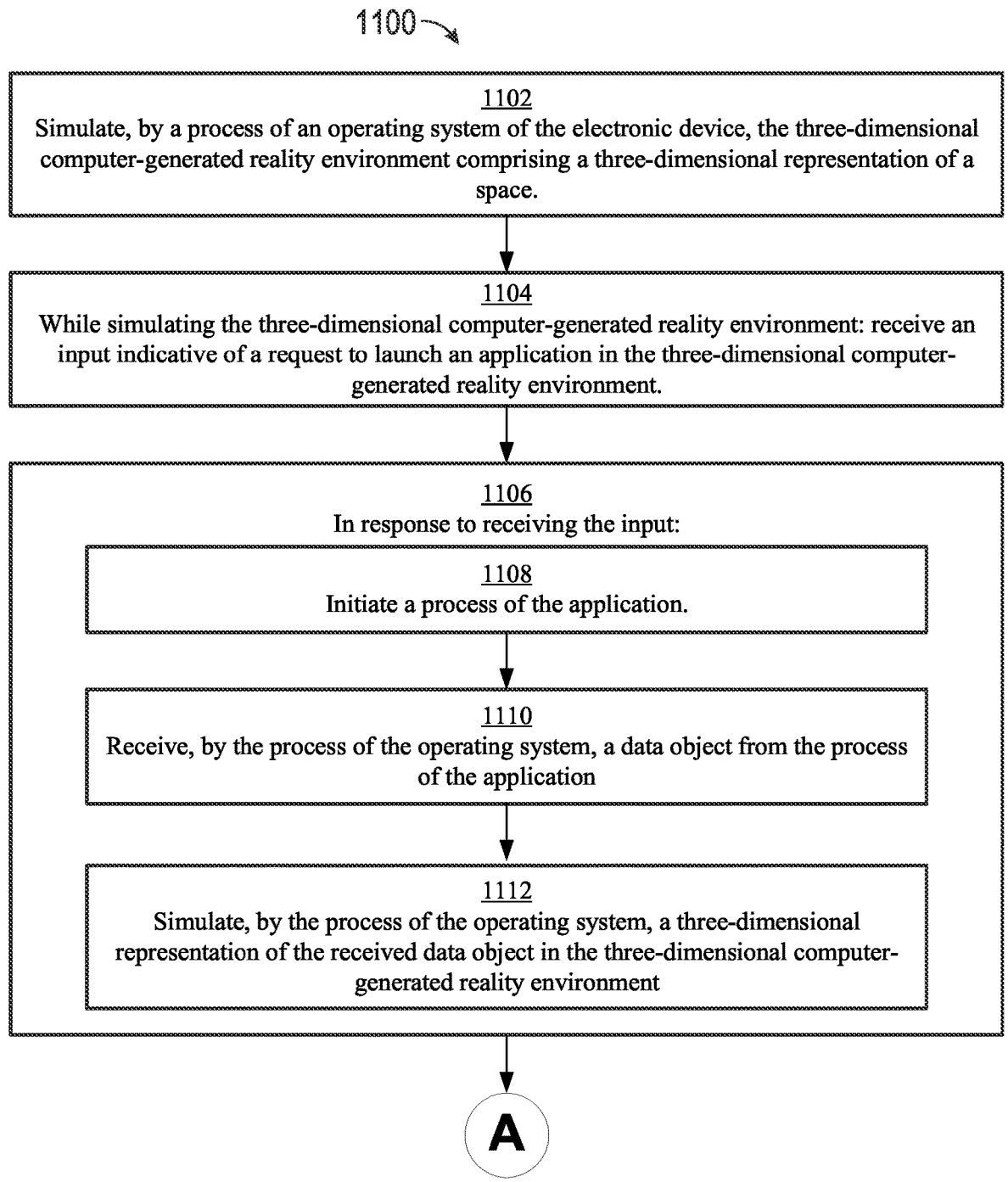
Figure 11B:
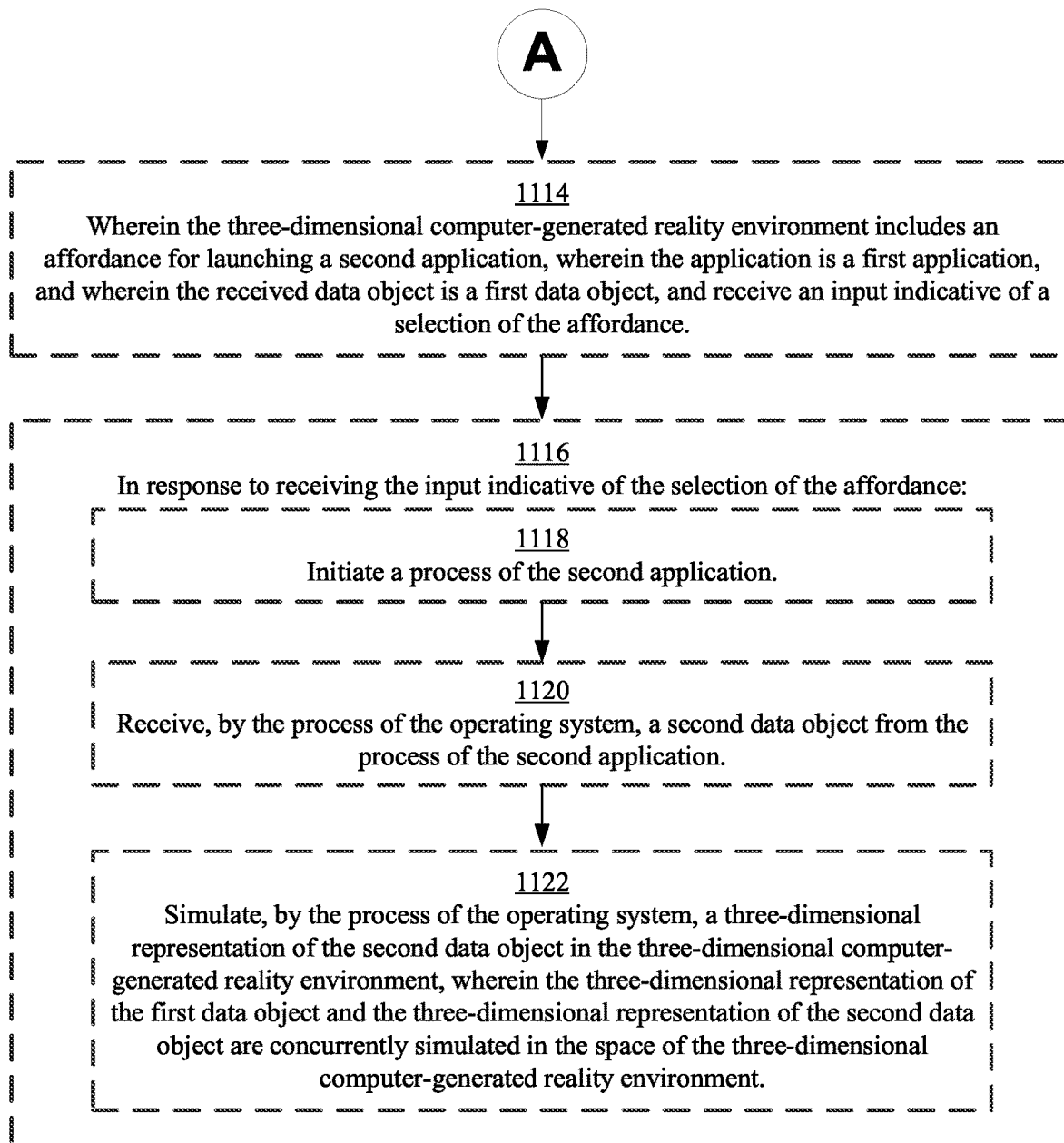

FIGS. 11A-11C are a flow diagram illustrating a method for providing a computer-generated reality platform capable of generating a three-dimensional computer-generated reality environment, in accordance with some embodiments. Method 1100 is performed at an electronic device (e.g., 100 or 500).

The electronic device (e.g., 500) simulates (1102), by a process (e.g., 510) of an operating system of the electronic device, the three-dimensional computer-generated reality environment (e.g., 600) comprising a three-dimensional representation (e.g., as shown in view 1000 of FIG. 10A) of a space (e.g., of physical room 802). For example, centralized process 510 simulates an initial experience of a CGR environment (e.g., in response to initializing the CGR environment). The initial experience can be a simulation of, for example, the user's room, a forest, etc.

In some embodiments, simulating includes performing one or more computations to create a representation (e.g., of a CGR environment, and/or one or more data objects). In some embodiments, simulating (e.g., of a CGR environment, and/or one or more data objects) includes maintaining the representation in memory.

While simulating (e.g., and, optionally, rendering and causing a display of) the three-dimensional computer-generated reality environment: the electronic device receives (1104) an input (e.g., selection of 1010A) indicative of a request to launch an application (e.g., a lamp application) in the three-dimensional computer-generated reality environment. In some embodiments, the device's user navigates to an application selection interface (e.g., 1010), selects and/or downloads an application, and the device launches the respective application.

In response to receiving the input (1106), the electronic device initiates (1108) a process of the application (e.g., 502). Further in response to receiving the input, the electronic device receives (1110), by the process of the operating system, a data object (e.g., 502A) from the process of the application. Further in response to receiving the input, the electronic device simulates (1112), by the process of the operating system, a three-dimensional representation (e.g., lamp 614 in view 1002 of FIG. 10A) of the received data object in the three-dimensional computer-generated reality environment. For example, as shown in FIG. 10A, lamp 614 (corresponding to data object 502A) is added to the CGR environment 600 in response to an input (e.g., selection of affordance 1010A of FIG. 10B).

In some embodiments, the three-dimensional computer-generated reality environment includes an affordance (e.g., 1010B) for launching a second application (e.g., 504), wherein the application (e.g., 502) is a first application, and wherein the received data object is a first data object (e.g., 502A). The electronic device receives (1114) an input indicative of a selection of the affordance (e.g., 1010B).

In some embodiments, in response to receiving (1116) the input indicative of the selection of the affordance, the electronic device initiates (1118) a process of the second application (e.g., 504). Further in response to receiving the input indicative of the selection of the affordance, the electronic device receives (1120), by the process of the operating system, a second data object (e.g., 504A) from the process of the second application. For example, the second application provides a data object via IPC to the process of the operating system.

Further in response to receiving the input indicative of the selection of the affordance, the electronic device simulates (1122), by the process of the operating system, a three-dimensional representation (e.g., 612 of FIG. 10A) of the second data object (e.g., 504A) in the three-dimensional computer-generated reality environment (e.g., as shown in view 1004 of FIG. 10A), wherein the three-dimensional representation of the first data object and the three-dimensional representation of the second data object are concurrently simulated in the space of the three-dimensional computer-generated reality environment. For example, a launched spreadsheet application adds spreadsheet 612 to the CGR environment 600 as shown in views 1002 (no spreadsheet) and 1004 (spreadsheet 612 is present) of FIG. 10A. In view 1004, both the lamp 614 and the spreadsheet 612 are concurrently simulated in the CGR environment.

In some embodiments, the three-dimensional computer-generated reality environment includes a three-dimensional representation (e.g., table 610 in view 1004 of FIG. 10A) of an entity (e.g., a table), and wherein simulating the three-dimensional representation of the received data object in the three-dimensional computer-generated reality environment comprises: updating (1124) the three-dimensional representation (e.g., table 610 in view 1004 of FIG. 10A) of the entity based on the received data object (e.g., data object 502A representing lamp 614 in view 1004), wherein the three-dimensional representation of the received data object and the updated three-dimensional representation of the entity are concurrently simulated in the space of the three-dimensional computer-generated reality environment. For example, after adding a light source (lamp 614, represented by the received data object) to the space (resting on the table 610), the simulation of the table 610 is updated to take into account the effect of the light from the lamp 614.

In some embodiments, the second data object is obtained by a process (e.g., 510) of the operating system (e.g., 420).

In some embodiments, the application is a first application, wherein the entity (e.g., table 610 of FIG. 10A) is (e.g., is represented by) a third data object corresponding to a third application, and the electronic device receives (1126), by the process of the operating system, the third data object from a process of the third application. For example, the entity can be represented by a data object generated by a process of an application (e.g., a cooperative application) rather than a process of the operating system.

In some embodiments, the application is a first application, and wherein the first application and the second application are associated with different service providers. For example, the first and second applications are associated with different third-party developers/creators/publishers, or the like. In some embodiments, the first application is associated with a first service provider and not with a second service provider and the second application is associated with the second service provide and not with the first service provider.

In some embodiments, the operating system and the application are associated with different service providers. For example, the application is associated with a third-party developer/creator/publisher, or the like. In some embodiments, the operating system is associated with a first service provider and not with a second service provider and the application is associated with the second service provide and not with the first service provider.

In some embodiments, the received data object includes data representative of one or more of: one or more properties of the received data object, one or more behaviors of the received data object, and one or more events of the received data object.

In some embodiments, the electronic device renders (1128), by the process of the operating system, the computer-generated reality environment including the representation of the first data object and the representation of the second data object.

In some embodiments, the electronic device causes a display of the rendered computer-generated reality environment.

In some embodiments, the process of the operating system operates at a kernel level access level. In some embodiments, the process of the application operates at a lower access level than a kernel level access level.

As described above, one aspect of the present technology is the gathering and use of data available from various sources to improve the delivery to users of interactive content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user, or to prevent such information from being shared with other users. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of shared virtual space services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the device associated with the user, or publicly available information.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and embodiments have been fully described with reference to the accompanying drawings, it is to be noted that various changes and modifications will become apparent to those skilled in the art. Such changes and modifications are to be understood as being included within the scope of the disclosure and embodiments as defined by the claims.

What is claimed is:

1. An electronic device, comprising:
one or more processors; and
memory storing one or more programs configured to be executed by the one or more processors, the one or more programs including instructions for:
receiving a first input indicative of a request to display a first data object in a three-dimensional computer-generated reality environment;
in response to receiving the first input, providing data object data for the first data object, wherein:
the first data object includes a first portion that is subject to a sharing restriction and a second portion that is not subject to the sharing restriction, and
the data object data includes the second portion without including the first portion,
rendering a three-dimensional representation of the first data object using the provided data object data including the second portion that is not subject to the sharing restriction, wherein the three-dimensional representation of the first data object is rendered with replacement content for the first portion that is subject to the sharing restriction; and
causing a display of a three-dimensional representation of the first data object in the three-dimensional computer-generated reality environment.

2. The electronic device of claim 1, wherein the first data object includes data representative of one or more of:
one or more properties of the first data object;
one or more behaviors of the first data object; and
one or more events of the first data object.

3. The electronic device of claim 2, wherein the one or more properties include a value indicative of an appearance of the three-dimensional representation of the first data object, wherein the three-dimensional representation of the first data object is rendered based on the value indicative of the appearance.

4. The electronic device claim 2, wherein the one or more behaviors are indicative of one or more actions by the three-dimensional representation of the first data object in the computer-generated reality environment.

5. The electronic device of claim 2, wherein the one or more events are indicative of one or more actions by the three-dimensional representation of the first data object performed in response to a state change in the computer-generated reality environment.

6. The electronic device of claim 1, wherein the electronic device is a headset base station.

7. A non-transitory computer-readable storage medium storing one or more programs configured to be executed by one or more processors of an electronic device, the one or more programs including instructions for:
receiving a first input indicative of a request to display a first data object in a three-dimensional computer-generated reality environment;
in response to receiving the first input, providing data object data for the first data object, wherein:
the first data object includes a first portion that is subject to a sharing restriction and a second portion that is not subject to the sharing restriction, and
the data object data includes the second portion without including the first portion,
rendering a three-dimensional representation of the first data object using the provided data object data including the second portion that is not subject to the sharing restriction, wherein the three-dimensional representation of the first data object is rendered with replacement content for the first portion that is subject to the sharing restriction; and causing a display of a three-dimensional representation of the first data object in the three-dimensional computer-generated reality environment.

8. The non-transitory computer-readable storage medium of claim 7, wherein the first data object includes data representative of one or more of:

one or more properties of the first data object;
one or more behaviors of the first data object; and
one or more events of the first data object.

9. The non-transitory computer-readable storage medium of claim 8, wherein the one or more properties include a value indicative of an appearance of the three-dimensional representation of the first data object, wherein the three-dimensional representation of the first data object is rendered based on the value indicative of the appearance.

10. The non-transitory computer-readable storage medium of claim 8, wherein the one or more behaviors are indicative of one or more actions by the three-dimensional representation of the first data object in the computer-generated reality environment.

11. The non-transitory computer-readable storage medium of claim 8, wherein the one or more events are indicative of one or more actions by the three-dimensional representation of the first data object performed in response to a state change in the computer-generated reality environment.

12. The non-transitory computer-readable storage medium of claim 7, wherein the electronic device is a headset base station.

13. A method for providing a three-dimensional computer-generated reality environment, the method comprising:

at an electronic device with one or more processors and memory:

receiving a first input indicative of a request to display a first data object in the three-dimensional computer-generated reality environment;

in response to receiving the first input, providing data object data for the first data object, wherein:

the first data object includes a first portion that is subject to a sharing restriction and a second portion that is not subject to the sharing restriction, and the data object data includes the second portion without including the first portion, rendering a three-dimensional representation of the first data object using the provided data object data including the second portion that is not subject to the sharing restriction, wherein the three-dimensional representation of the first data object is rendered with replacement content for the first portion that is subject to the sharing restriction; and causing a display of a three-dimensional representation of the first data object in the three-dimensional computer-generated reality environment.

14. The method of claim 13, wherein the first data object includes data representative of one or more of:

one or more properties of the first data object;
one or more behaviors of the first data object; and
one or more events of the first data object.

15. The method of claim 14, wherein the one or more properties include a value indicative of an appearance of the three-dimensional representation of the first data object, wherein the three-dimensional representation of the first data object is rendered based on the value indicative of the appearance.

16. The method of claim 14, wherein the one or more behaviors are indicative of one or more actions by the three-dimensional representation of the first data object in the computer-generated reality environment.

17. The method of claim 14, wherein the one or more events are indicative of one or more actions by the three-dimensional representation of the first data object performed in response to a state change in the computer-generated reality environment.

18. The method of claim 13, wherein the electronic device is a headset base station.

* * * * *

UNITED STATES PATENT AND TRADEMARK OFFICE
CERTIFICATE OF CORRECTION

PATENT NO. : 11,875,162 B2
APPLICATION NO. : 17/845708
DATED : January 16, 2024
INVENTOR(S) : Helmut Garstenauer et al.

It is certified that error appears in the above-identified patent and that said Letters Patent is hereby corrected as shown below:

In the Specification

Column 1, Line 9:
Delete "continuation" and insert --continuation of--.

In the Claims

Claim 1, Column 46, Line 17:
Delete "portion" and insert --portion of--.

Claim 4, Column 46, Line 39:
Delete "device" and insert --device of--.

Claim 7, Column 46, Line 63:
Delete "portion," and insert --portion;--.

Claim 13, Column 48, Line 8:
Delete "portion," and insert --portion;--.

Signed and Sealed this
Fifth Day of March, 2024

Katherine Kelly Vidal
*Director of the United States Patent and Trademark Office*